United States Patent [19]

Aoki et al.

[11] Patent Number: 6,166,842
[45] Date of Patent: Dec. 26, 2000

[54] SCANNING IMAGE FORMING LENS AND OPTICAL SCANNING APPARATUS

[75] Inventors: Magane Aoki, Yokosuka; Kohji Sakai, Tokyo, both of Japan

[73] Assignee: Ricoh Company, Ltd., Tokyo, Japan

[21] Appl. No.: 09/233,884

[22] Filed: Jan. 20, 1999

[30] Foreign Application Priority Data

Jan. 23, 1998 [JP] Japan ................................. 10-011844

[51] Int. Cl.[7] .................................................. G02B 26/08
[52] U.S. Cl. .......................... 359/205; 359/207; 359/216
[58] Field of Search ................................... 359/205, 207, 359/216–219, 662, 708, 716, 718

[56] References Cited

U.S. PATENT DOCUMENTS

| 5,737,112 | 4/1998 | Iizuka . | |
|---|---|---|---|
| 5,875,051 | 11/1999 | Suzuki et al. | 359/205 |
| 5,986,791 | 11/1999 | Suzuki et al. | 359/207 |

FOREIGN PATENT DOCUMENTS 9-49967   2/1997   Japan .

*Primary Examiner*—Darren E. Schuberg
*Assistant Examiner*—Fayez Assaf
*Attorney, Agent, or Firm*—Greenberg Traurig LLP

[57] ABSTRACT

A scanning and image forming lens system in an optical scanning apparatus optical scans a surface to be scanned by deflecting a luminous flux emitted from a light source in a direction corresponding to a main scanning direction via an optical deflector at equiangular velocity. The scanning image forming lens system transmits the luminous flux deflected by the optical deflector so as to condense the luminous flux into an optical beam spot on the surface to be scanned and to scan the surface to be scanned with the optical beam spot. The scanning image forming lens system includes one or more image forming optical elements including at least one lens. At least one lens surface of the at least one lens of the scanning image forming lens system has a non-arc shape in a sub scanning cross section. The non-arc shape changes according to a position in a direction that is substantially perpendicular to the sub scanning cross section such that a positional deviation of the optical beam waist of the deflected luminous flux from the surface to be scanned at each position in the direction perpendicular to the sub scanning cross section, which is caused by a paraxial curvature of field of the scanning image forming lens system in a sub scanning direction, is corrected.

35 Claims, 19 Drawing Sheets

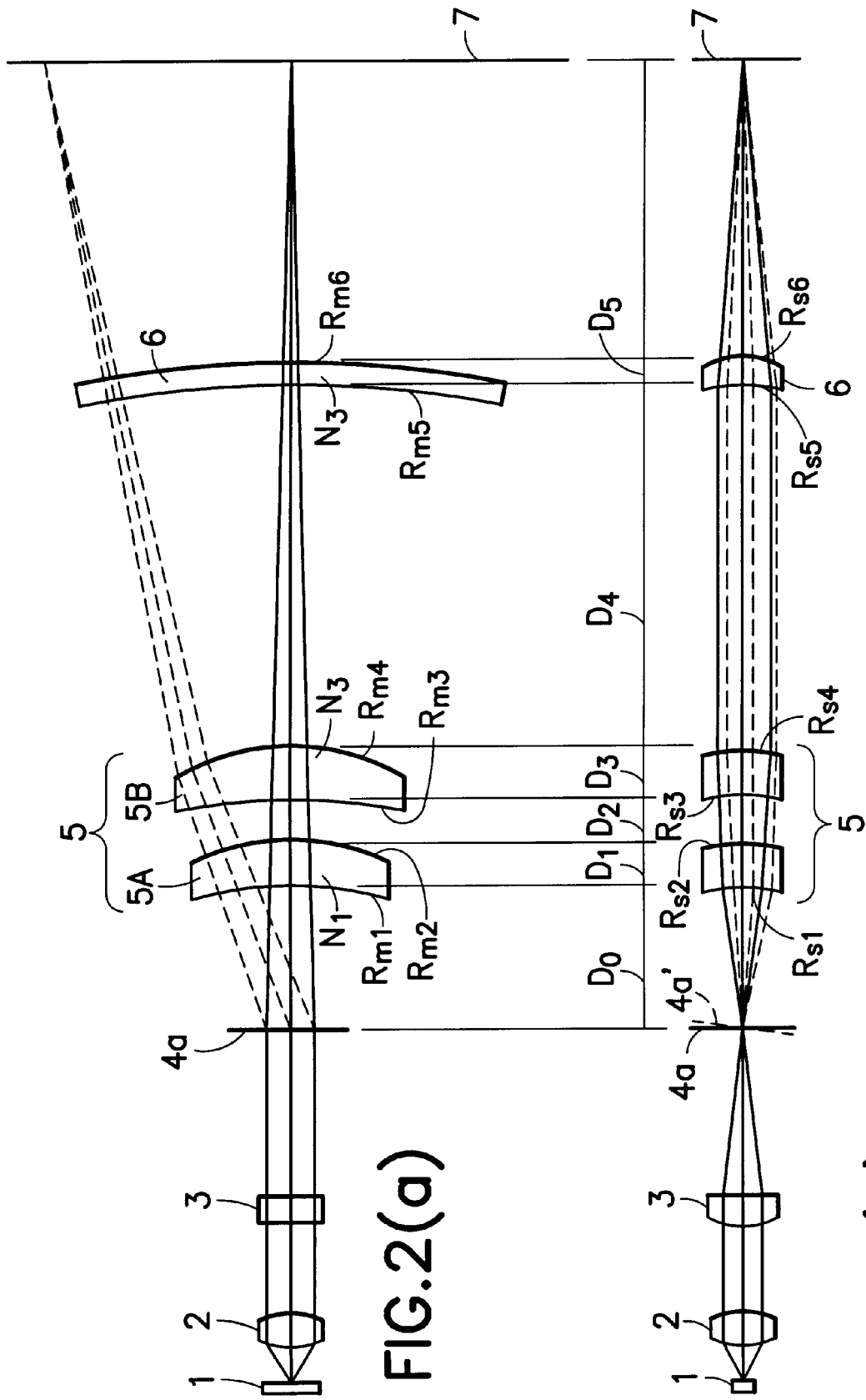

SCANNING IMAGE FORMING LENS AND OPTICAL SCANNING APPARATUS

BACKGROUND OF THE INVENTION

1. Field of the Invention

The present invention relates to a scanning image forming lens and an optical scanning apparatus.

2. Description of the Related Art

An optical scanning apparatus for optically scanning a surface to be scanned at a constant velocity by deflecting a luminous flux emitted from a light source via an optical deflector so as to transmit the luminous flux through a scanning image forming lens to be condensed into an optical beam spot on the surface to the scanned is well known in an image forming apparatus such as a laser printer, a digital copier, a facsimile machine and other such devices. The luminous flux is deflected in a direction corresponding to a main scanning direction for the surface to be scanned at equiangular velocity by rotation of the optical deflector such that the optical beam spot formed by the scanning image forming lens scans the surface to be scanned at a constant velocity in the main scanning direction. Typically, the surface to be scanned includes a photoconductor and the optical beam spot forms picture elements which constitute an image to be formed on the surface to be scanned.

The above-mentioned main scanning direction refers to the direction corresponding to the main scanning direction for a surface to be scanned along a light path from a light source to the surface to be scanned. A direction corresponding to a sub scanning direction refers to the direction corresponding to a sub scanning direction for the surface to be scanned along the light path. The sub scanning direction is substantially perpendicular to the direction corresponding to the main scanning direction.

In such an optical scanning apparatus, when the optical beam spot scans the surface to be scanned in the main scanning direction, if the diameter of the optical beam spot changes depending upon the position of the optical beam spot in the main scanning direction on the surface to be scanned, the size of each picture element, which is formed by the optical beam spot on the surface to be scanned so as to form an image on the surface to be scanned, changes depending upon the position where each picture element is written on the surface to be scanned in the main scanning direction. Consequently, the resolution of the formed image changes along the main scanning direction, resulting in deteriorating of image quality. A position on the surface to be scanned in the main scanning direction is sometimes referred to herein as "image height".

A change in the diameter of the optical beam spot in the main scanning direction on the surface to be scanned according to the position of the optical beam spot in the main scanning direction can be corrected to a certain degree, for example, by adjusting the time for writing each picture element on the surface to be scanned with the optical beam spot. However, a change in the diameter of the optical beam spot in the sub scanning direction according to the position of the optical beam spot in the main scanning direction cannot be corrected by adjusting the writing time for the optical beam spot. The change in the diameter of the optical beam spot in the sub scanning direction according to the position of the optical beam spot in the main scanning direction is typically corrected through adjustment of the optical performance of an optical lens system used for transmitting the light flux, which is deflected by the optical deflector in the direction corresponding to the main scanning direction, such that the luminous flux is condensed into an optical beam spot on the surface to be scanned. The optical lens system for transmitting the deflected light flux so as to form an optical beam spot and to scan the surface to be scanned with the optical beam spot is herein called a scanning image forming lens.

It is known that a change of an optical beam spot diameter in the sub scanning direction on a surface to be scanned according to the image height can be suppressed by correcting the curvature of field of the scanning image forming lens in the sub scanning direction. Typically, correction of the curvature of field in the sub scanning direction is made only relative to a paraxial luminous flux of the scanning image forming lens system.

However, correction of the curvature of field of the scanning image forming lens must be performed while keeping the other optical characteristics of the scanning image forming lens at a satisfactory level. For example, the constant velocity characteristics must be kept at a satisfactory level for enabling the optical beam spot to be moved at a constant velocity along the surface to be scanned. Typically, when the curvature of field is corrected, the other optical characteristics deteriorate.

In addition, when, for example, a photoconductor is used in an optical scanning apparatus as the surface to be scanned for forming an image thereupon, an assembly tolerance of the photoconductor in relation to the scanning image forming lens must be carefully considered in the design of the apparatus for accomplishing a desired level of the curvature of field in the scanning image forming lens. More specifically, even when the curvature of field of the scanning image forming lens is accurately corrected in the design of the scanning image forming lens, the curvature of field of the scanning image forming lens as designed may not necessarily be realized if the actual position of the surface to be scanned in relation to the scanning image forming lens is deviated from the designed position due to, for example, an assembling error relating to the position of the surface to be scanned relative to the scanning image forming lens.

SUMMARY OF THE INVENTION

In order to overcome the problems described above, preferred embodiments of the present invention provide a scanning image forming lens and an optical scanning apparatus that accurately correct any changes in diameter of an optical beam spot in a sub scanning direction according to the image height.

The preferred embodiments of the present invention also provide a scanning image forming lens and an optical scanning apparatus that limit any changes of the diameter of an optical beam spot according to the image height within a predetermined range in a sub scanning direction when a surface to be scanned is positioned within a predetermined range of assembling tolerance relative to the scanning image forming lens.

A scanning image forming lens system according to a specific preferred embodiment of the present invention is preferably used in an optical scanning apparatus for optically scanning a surface to be scanned by deflecting a luminous flux emitted from a light source in a direction corresponding to a main scanning direction via an optical deflector at equiangular velocity. The scanning image forming lens system transmits the luminous flux deflected by the optical deflector so as to condense the luminous flux into an optical beam spot on the surface to be scanned and to scan the surface to be scanned with the optical beam spot.

The scanning image forming lens system according to preferred embodiments of the present invention includes one or more image forming optical elements. The one or more image forming elements preferably includes at least one lens having at least one lens surface that preferably has a non-arc shape in a sub scanning cross section. The non-arc shape changes according to a position in a direction that is substantially perpendicular to the sub scanning cross section (i.e., a position in a direction corresponding to a main scanning direction, which is referred to as an image height) such that a positional deviation of the optical beam waist of the deflected luminous flux from the surface to the scanned at each position in the direction that is substantially perpendicular to the sub scanning cross section, which is caused by a paraxial curvature of field of the scanning image forming lens system in a sub scanning direction, is corrected.

The above-mentioned sub scanning cross section herein refers to a flat cross section which is substantially perpendicular to the direction corresponding to the main scanning direction. An optical beam waist herein refers to a portion of a luminous flux having a minimum diameter. A paraxial curvature of field in a sub scanning direction is caused by a paraxial luminous flux with respect to a scanning image forming lens system, and is typically called a curvature of field in the sub scanning direction. Further, a lens surface having a non-arc shape in a sub scanning cross section and in which the non-arc shape changes according to a position in a direction perpendicular to a sub scanning cross section such that a positional deviation of the optical beam waist of a deflected luminous flux from a surface to be scanned at each position in the direction that is substantially perpendicular to the sub scanning cross section is corrected is herein called a "beam waist position correcting lens surface" for the convenience of explanation.

In the above-described configuration, the scanning image forming lens system may include two or more lenses. Further, the scanning image forming lens system may include a reflective mirror having a focusing function in addition to the lens. For example, the scanning image forming lens system may include a combination of one or more such reflective mirrors and one or more lenses.

Further, the beam waist position correcting lens surface may be formed at more than two lens surfaces in the scanning image forming lens system. In such a case, the beam waist position correcting lens surface may be formed, for example, at both surfaces of one lens that is included in the scanning image forming lens system, or at one surface of each of the two lens that are included in the scanning image forming lens system.

According to the above-described preferred embodiments, a change in a diameter of an optical beam spot in a sub scanning direction on a surface to be scanned, according to a position of the optical beam spot in a main scanning direction, can be maintained, for example, within a range of about plus and minus 5%, regardless of the existence of a paraxial curvature of field in the sub scanning direction in the scanning image forming lens system. A diameter of an optical beam spot formed by a luminous flux herein refers to the diameter of a part of the optical beam spot where the light intensity is $e^{-2}$ wherein e=2.71828.

In another preferred embodiment, the non-arc shape of the at least one lens surface of the at least one lens included in the scanning image forming lens system may be configured so as to change according to the position in the direction that is substantially perpendicular to the sub scanning cross section such that a change in a diameter of the optical beam spot in a direction corresponding to the sub scanning direction according to the position in the direction that is substantially perpendicular to the sub scanning cross section is maintained within a predetermined range when an assembling tolerance of the surface to be scanned relative to an originally designed position for the surface to be scanned is within a predetermined tolerance range.

Further, the non-arc shape of the at least one lens surface may be configured such that a paraxial curvature center line plotting a paraxial curvature center of the non-arc shape of the at least one lens surface of the lens has a curved line in a main scanning cross section. A main scanning cross section herein refers to a flat cross section including an optical axis of the lens surface having the above-described non-arc shape and which is substantially parallel to the main scanning direction.

Furthermore, the non-arc shape of the at least one lens surface of the lens that is included in the scanning image forming lens system may be formed asymmetrically relative to the optical axis of the lens having the non-arc shape. With such an asymmetrical configuration of the non-arc shape, when a polygonal mirror is used as the optical deflector, the influence of a so-called sag condition of the polygonal mirror on a change in the diameter of an optical beam spot in the sub scanning direction is greatly reduced.

The at least one lens that is included in the scanning image forming lens system and that has the at least one lens surface having the non-arc shape in the sub scanning cross section may preferably be formed of a plastic material, because the non-arc shape can be relatively easily formed with plastic using a molding process.

The above scanning image forming lens system may preferably have a function to enable the luminous flux which is deflected by the optical deflector at equiangular velocity to scan the surface to the scanned at a constant velocity, and a function to establish a conjugate relationship in a geometric-optic manner between a position near a deflecting point of the optical deflector and a position near the surface to be scanned in the direction corresponding to the sub scanning direction.

In another preferred embodiment in which the scanning image forming lens system includes three lenses, one of the three lenses that is located nearest the surface to be scanned along the light path may include the at least one lens surface that has the non-arc shape in the sub scanning cross section, with the non-arc shape changing according to the position in the direction substantially perpendicular to the sub scanning cross section. The at least one lens surface that has the non-arc shape in the sub scanning cross section may be located at a side of the surface to be scanned or at a side of the optical deflector.

According to one specific preferred embodiment of the present invention, an apparatus includes a light source for outputting light, a first lens system arranged to receive the light output from the light source and to transmit a light flux therefrom, an optical deflector arranged to receive the light flux from the first lens system and to deflect the light flux from a surface therefrom, and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface including a plurality of portions each having a non-arc shape in a sub-scanning direction such that at least two of the non-arc shapes are different from each other.

According to another specific preferred embodiment of the present invention, an apparatus includes a light source for outputting light, a first lens system arranged to receive the light output from the light source and to transmit a light flux therefrom, an optical deflector arranged to receive the light flux from the first lens system and to deflect the light flux from a surface therefrom, and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface having a plurality of portions each having a non-arc shape in a sub-scanning direction such that a beam waist of the entire luminous flux is located at a surface to be scanned for all image heights.

In another preferred embodiment of the present invention, an apparatus includes a light source for outputting light, a first lens system arranged to receive the light output from the light source and to transmit a light flux therefrom, an optical deflector arranged to receive the light flux from the first lens system and to deflect the light flux from a surface therefrom, and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface having a plurality of portions each of which contains a non-arc shape in a sub-scanning direction such that a minimum beam spot diameter in the sub-scanning direction is located at a surface to be scanned and comprises a least circle of confusion of the entire luminous flux.

In a further preferred embodiment of the present invention, an apparatus includes a light source for outputting light, a first lens system arranged to receive the light output from the light source and to transmit a light flux therefrom, an optical deflector arranged to receive the light flux from the first lens system and to deflect the light flux from a surface therefrom, and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface having a plurality of portions each of which contains a non-arc shape in a sub-scanning direction such that defocusing lines for a plurality of image heights are substantially coincident with each other.

Another preferred embodiment of the present invention includes a light source for outputting light, a first lens system arranged to receive the light output from the light source and to transmit a light flux therefrom, an optical deflector arranged to receive the light flux from the first lens system and to deflect the light flux from a surface therefrom, and a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface having a plurality of portions each of which contains a non-arc shape in a sub-scanning direction such that all beam spot diameters are within a range for all image heights.

These and other elements, features, and advantages of the preferred embodiments of the present invention will be apparent from the following detailed description of the preferred embodiments of the present invention, as illustrated in the accompanying drawings.

BRIEF DESCRIPTION OF THE DRAWINGS

FIG. 2($a$) is a view in a direction corresponding to a sub scanning direction illustrating the optical arrangement of the optical scanning apparatus shown in FIG. 1 along the optical axis extending from a light source to a surface to be scanned.

FIG. 2($b$) is a view in a direction corresponding to a main scanning direction illustrating the optical arrangement of the optical scanning apparatus shown in FIG. 1 along the optical axis extending from a light source to a surface to be scanned.

DETAILED DESCRIPTION OF PREFERRED EMBODIMENTS

Figure 1:
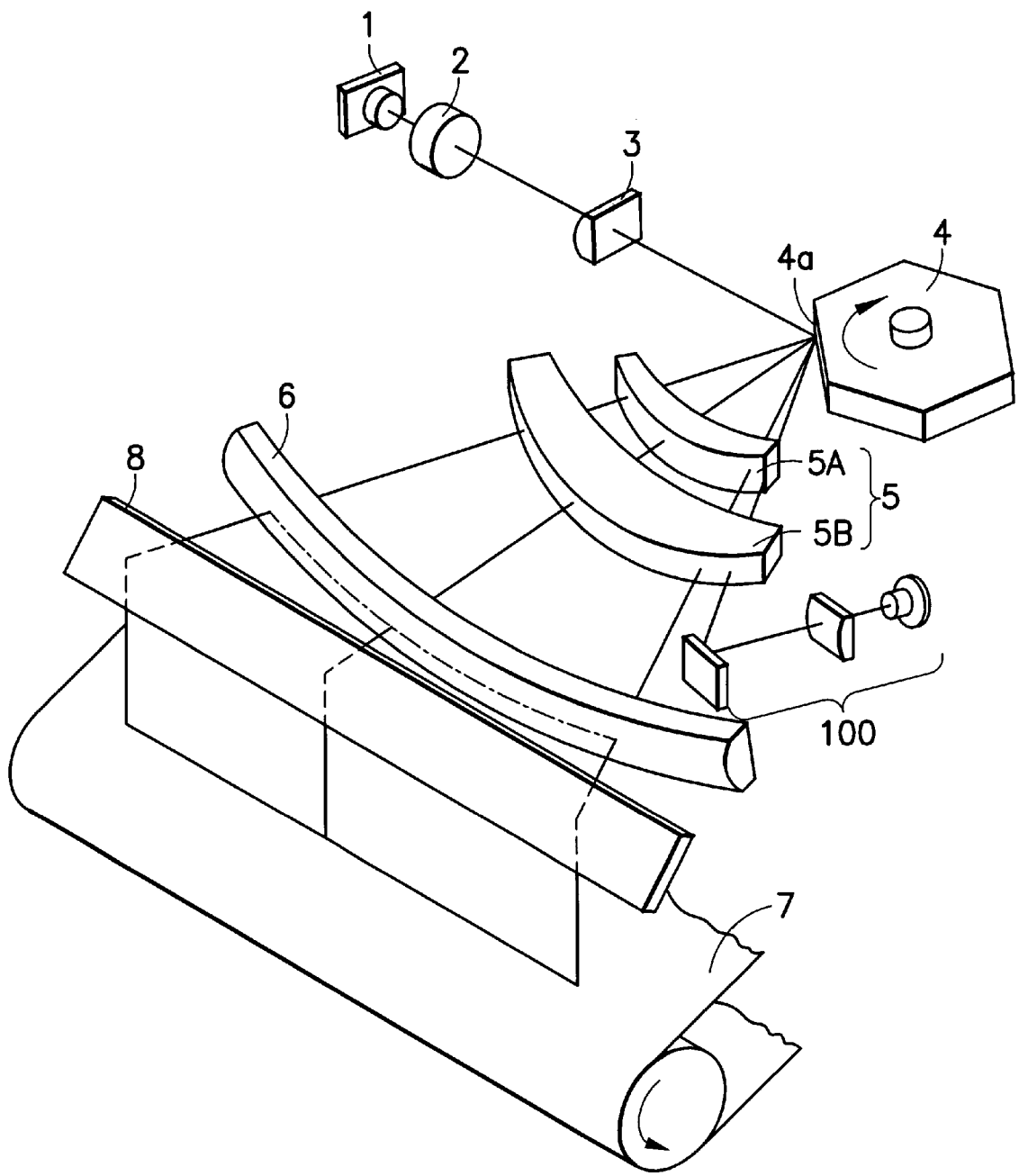
FIG. 1 is a schematic drawing illustrating a preferred embodiment of an optical scanning apparatus according to the present invention.

FIG. 1 schematically illustrates a preferred embodiment of an optical scanning apparatus according to the present invention.

A light source 1 preferably includes a semiconductor laser or other suitable light source. A divergent laser luminous flux emitted from the light source 1 preferably has a wavelength of about 780 mm and is coupled to a subsequent optical system via a coupling lens 2 after the divergence of the luminous flux is reduced by the coupling lens 2. The coupling lens 2 may be configured so as to convert the laser luminous flux from the light source 1 into a parallel or weak divergent or weak condensing flux. In this preferred embodiment, the coupling lens 2 converts the luminous flux from the light source into a parallel flux.

The luminous flux coupled by the coupling lens 2 is condensed only in a direction corresponding to a sub scanning direction by a cylindrical lens 3 which functions as a linear image forming lens system. The luminous flux is formed as a linear image extending in a direction corresponding to a main scanning direction near a deflecting reflective surface 4a of a polygonal mirror which functions as an optical deflector.

The luminous flux reflected by the deflecting reflective surface 4a is deflected at equiangular velocity by rotation of the polygonal mirror 4 at a constant velocity in a direction indicated by an arrow in FIG. 1. The deflected luminous flux passes through lenses 5A, 5B, 6, and is then bent by a flat mirror 8 for bending the light path so as to condense the luminous flux into an optical beam spot and to optically scan a surface of a photoconductor 7. The surface of the photoconductor 7 corresponds to an actual surface to be scanned by a scanning image forming lens and must be placed in a position desired in the optical design for an optical scanning apparatus using the scanning image forming lens.

The lens elements 5A, 5B, 6 constitute a scanning image forming lens system according to preferred embodiments of the present invention. The lens system 5 including the lenses 5A and 5B includes functions to condense a deflected luminous flux in a direction corresponding to a main scanning direction on the surface to be scanned and to enable the luminous flux being deflected at equiangular velocity to scan the surface to be scanned at a constant velocity. The characteristic to scan the surface to be scanned at the constant velocity is herein sometimes referred to as "linearity".

The lens 6 functions, in cooperation with the other elements of the lens system 5, to establish an approximately conjugate relationship in a geometric manner between a position near a deflecting point of the deflecting reflective surface 4a and a position near the surface to be scanned, and to correct a curvature of field in the sub scanning direction.

FIGS. 2(a) and 2(b) are diagrams illustrating the optical arrangement of the optical scanning apparatus shown in FIG. 1 along the optical axis from the light source 1 to the surface 7 to be scanned. FIG. 2(a) illustrates a view from a direction corresponding to the sub scanning direction (a direction approximately perpendicular to the surface of FIG. 2(a)) and FIG. 2(b) illustrates a view from a direction corresponding to the main scanning direction (a direction approximately perpendicular to the surface of FIG. 2(b)), respectively.

Referring to FIG. 2(b), even when the deflecting reflective surface 4a of the polygonal mirror 4 tilts as indicated by a dotted line 4a' and thereby a luminous flux deflected by the tilted deflecting reflective surface 4a' is directed in a direction indicated by dotted lines, because the scanning image forming lens system according to preferred embodiments of the present invention, which includes the lens elements 5A, 5B and 6, is configured so as to establish an approximately conjugate relationship in a geometric manner between a position near a deflecting point of the deflecting reflective surface 4a and a position near the surface 7 to be scanned, the luminous flux passed through the scanning image forming lens system is condensed so as to form an optical beam spot at substantially the same position where a luminous flux, which is deflected by the deflecting reflective surface 4a having no tilt, is condensed to form an optical beam spot.

As described above, the optical scanning apparatus according to preferred embodiments of the present invention scans the surface 7 to be scanned by deflecting a luminous flux from the light source 1 via the optical deflector 4 so as to transmit through the scanning image forming lens system 5 to be condensed as an optical beam spot on the surface 7 to be scanned and to scan the surface to be scanned with the optical beam spot. The luminous flux from the light source 1 is condensed to form a linear image extending in a direction corresponding to the main scanning direction near the deflecting reflective surface 4a of the polygonal mirror 4 by means of the linear image forming optical system 3. The scanning image forming lens system 5 allows the luminous flux to be deflected by the optical deflector 4 at equiangular velocity to scan the surface to be scanned at a constant velocity, and also a function to establish an approximately conjugate relationship in a geometric manner between a position near a deflecting point of the optical deflector 4 and a position near the surface to be scanned in the direction corresponding to the sub scanning direction. Although the cylindrical lens 3 is used for the linear image forming lens system in this preferred embodiment, a substantially equivalent concave cylindrical mirror may be used.

The scanning image forming lens system according to preferred embodiments of the present invention preferably includes three lens elements 5A, 5B and 6 as described above, and of the six surfaces of these three lenses, at least one of these surfaces has a non-arc shape in the sub scanning cross section. In addition, the non-arc shape is configured so as to change according to the position in a direction approximately perpendicular to the sub scanning cross section such that a positional deviation of an optical beam waist of a luminous flux deflected from the surface to be scanned due to a paraxial curvature of field of the scanning image forming lens system in a sub scanning direction is corrected.

The beam waist position correcting lens surface as defined above may be configured such that a paraxial curvature center line plotting a paraxial curvature center of the non-arc shape in the direction approximately perpendicular to the sub scanning cross section direction forms a curved line in the main scanning cross section.

Figure 3A:
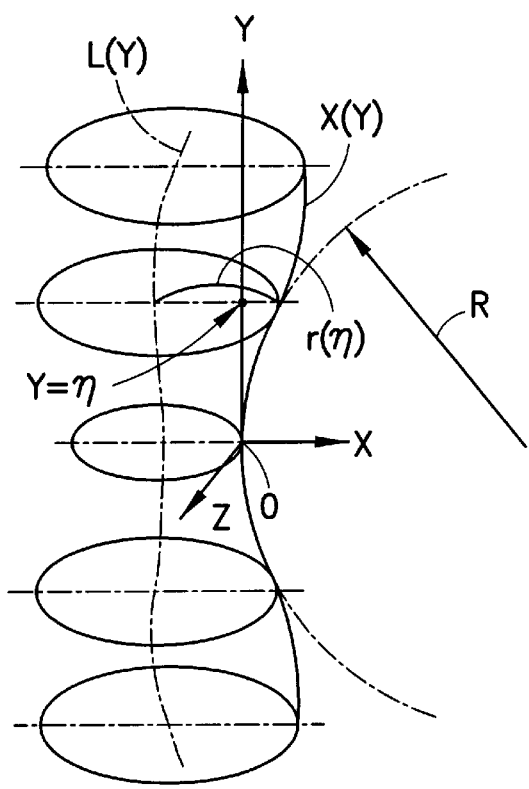
FIGS. 3($a$) and 3($b$) are schematic drawings for explaining a lens surface in which a paraxial curvature center line plotting a paraxial curvature center of a non-arc shape in a direction approximately perpendicular to a sub scanning cross section forms a curved line in a main scanning cross section.
Figure 3B:
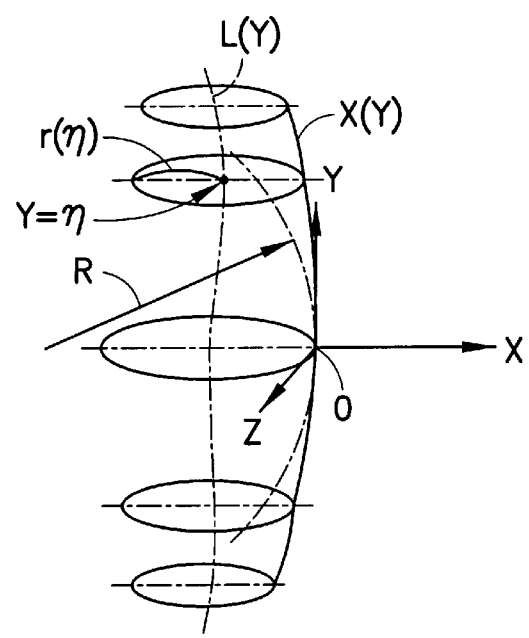

FIGS. 3(a) and 3(b) are schematic drawings for explaining a lens surface in which a paraxial curvature center line plotting a paraxial curvature center of a non-arc shape in a direction approximately perpendicular to a sub scanning cross section direction forms a curved line in a main scanning cross section.

In FIGS. 3(a) and 3(b), the Y axis is substantially parallel to the direction corresponding to the main scanning direction and the X axis denotes the optical axis of the lens having the beam waist position correcting lens surface. The Z axis is accordingly substantially parallel to the direction corresponding to the sub scanning direction. In FIG. 3(a), the plane substantially parallel to the XZ plane corresponds to the sub scanning cross section and the XY plane corresponds to the main scanning cross section. In FIGS. 3(a) and 3(b), a curve X(Y) indicates a non-arc shape of the beam waist position correcting lens surface in the main scanning cross section and R denotes a paraxial radius of curvature of the X(Y) curve. FIG. 3(a) illustrates the non-arc shape of the beam waist position correcting lens surface when R>0 and FIG. 3(b) illustrates the non-arc shape of the beams waist position correcting lens surface when R<0. R(η) denotes a paraxial radius of curvature of the non-arc shape of the beam waist position correcting lens surface in the sub scanning cross section at the position where Y=η. The paraxial radius of curvature center line L(Y) plotting a paraxial radius of curvature center of the beam waist position correcting lens surface is a curved line in the main scanning cross section which is the XY plane. That is, the beam waist position correcting lens surface has a freedom of determining the paraxial radius of curvature r(Y) in the sub scanning cross section according to a position in the direction approximately perpendicular to the sub scanning cross section independent of the curve X(Y).

Now, examples of the scanning image forming lens system according to preferred embodiments of the present invention are described. Two examples in which a beam waist position correcting lens surface is applied to the lens 6, which is located closest to and facing a surface to be scanned, will be explained, one example with the beam waist position correcting lens surface being applied to one of the lens surfaces of the lens 6, which is located at the side of the surface to be scanned, i.e., the sixth surface, and the other example with the beam waist position correcting lens surface being applied to other of the lens surfaces of the lens 6, which is located at the side of the optical deflector 4, i.e., the fifth surface.

In the following description, a radius of curvature of a lens surface in a direction corresponding to the main scanning is expressed by $R_{mi}$ (i=1–6), wherein "i" denotes the position of the lens surface counting from the surface facing the deflecting reflective surface 4a toward the surface facing the surface 7 to be scanned. That is, the lens surface located at the position facing the optical deflector 4 is denoted by 1 (i=1) and the lens surface facing the surface to be scanned is denoted by 6 (i=6). A radius of curvature of a lens surface in a direction corresponding to the sub scanning direction is expressed in a similar manner by $R_{ms}$. A distance between lens surfaces is denoted by $D_i$ (i=1–5). A refractive index of a lens at the wavelength 780 nm is denoted by $N_j$, wherein "j" denotes the position of the lens counting from the deflecting reflective plane 4a. A distance from a deflecting point of the deflecting reflective surface 4a to the surface of the lens 5A at the polygonal mirror side (i.e., the first surface) when the principal light of a deflected luminous flux (when the luminous flux is ideally deflected) matches with the optical axis of the scanning image forming lens is denoted by $D_0$ (i=0). A light flux from the light source 1 is converted to a parallel luminous flux by the coupling lens 2 and then condensed by the cylindrical lens 3 to be formed as a linear image extending in a direction corresponding to the main scanning direction at a position near the deflecting reflective surface 4a of the polygonal mirror 4. The focal length of the cylindrical lens 3 is preferably set to about 93.9 mm.

EXAMPLE 1

Data of the Example 1 is shown below. $R_{mi}$ expresses a paraxial radius of curvature in the main scanning cross section (corresponding to "R" in FIGS. 3(a) and 3(b)) and $R_{ms}$ expresses a paraxial radius of curvature in the sub scanning cross section when Y=0 (corresponding to r(0) in FIGS. 3(a) and 3(b)). The unit of value indicating a linear dimension is millimeter.

| i | $R_{mi}$ | $R_{si}$ | $D_i$ | j | $N_j$ |
|---|---|---|---|---|---|
| 0 | | | 50.9 | | |
| 1 | −96.76 | −96.76 | 15.07 | 1 | 1.78571 |
| 2 | −93.27 | −93.27 | 9.76 | | |
| 3 | −2450.2 | −2450.2 | 19.9 | 2 | 1.60909 |
| 4 | −161.76 | −161.76 | 127.0 | | |
| 5 | −630.0 | −55.53 | 3.0 | 3 | 1.57211 |
| 6 | −700.0 | −24.42 | | | |

The lenses 5A and 5B are preferably both spherical lens elements, such as a positive meniscus lens with a concave surface opposed to the polygonal mirror side. The lens surface of the lens 6 at the side of the polygonal mirror (the fifth surface) preferably has a toroidal shape and the lens surface of the lens 6 at the side of the surface to be scanned side (the sixth surface) is configured so as to form the beam waist position correcting lens surface having a non-arc shape in the sub scanning cross section.

A non-arc shape is a curve which is different from a circular arc and is generally expressed in the following formula (1), which is widely known as a formula related to a non-spherical shape, wherein X is the coordinate in the direction of the optical axis, Y is the coordinate in the direction corresponding to the main scanning direction (perpendicular to the optical axis) and K, $A_2$, $A_3$, $A_4$, and $A_5$ are constants:

$$X = CY^2 / \sqrt{[1 + \{1 - (KI)C^2Y^2\}]} + A_2 Y^2 + A_3 Y^3 + A_4 Y^4 + A_5 Y^5 \quad (1)$$

In the above formula (1), C expresses the paraxial radius of curvature (=1/$R_{m5}$=−1/630=1.687E−3) of the toroidal surface in the main scanning cross section, and the shape of the toroidal surface in the main scanning cross section is defined by using the following values:
K=−31.41, $A_4$=−2.06E−09, $A_6$=1.84E−14, $A_8$=6.37E−18, $A_{10}$=−8.92E−22, $A_{12}$=6.47E−26, $A_{14}$=−1.34E−30, $A_{16}$=−1.06E−34, $A_{18}$=4.41E−39

The value of $A_2$ and odd coefficients of Y are zero. In the above equation, "E and the value following E" in a numerical value represents the power of 10; e.g., "E−9" means $10^{-9}$, the numerical value being applied to the one immediately preceding it. Therefore, "$A_6$=1.84E−14" is an abbreviation of "$A_6$=1.84×$10^{-14}$."

Thus, the toroidal surface is a curved surface which is formed when the non-arc shape in the main scanning cross section as defined above is rotated about an axis which is approximately parallel to the Y axis at a position spaced from the non-arc shape to the polygonal mirror side by the distance $R_{s5}$=−55.53.

The shape of the beam waist position correcting lens surface, which is formed at the surface to be scanned side lens surface (the sixth surface) of the lens 6, is expressed as follows, wherein the X coordinate is approximately parallel to the optical axis, Y and Z coordinates are approximately perpendicular to each other and to the X coordinate, and the Y coordinate is approximately parallel to the direction corresponding to the main scanning direction. The Z coordinate is accordingly approximately parallel to the direction corresponding to the sub scanning direction. The beam waist position correcting lens surface is expressed by X(Y, Z), which is defined by the following formula (2):

$$X(Y, Z) = C_{m0}Y^2 / \sqrt{[1 + \{1 - (1 + a_0)C_{m0}^2 Y^2\}]} + \quad (2)$$
$$a_1 Y + a_3 Y^3 + a_4 Y^4 + a_5 Y^5 \ldots +$$
$$C_s(Y)Z^2 / \sqrt{[1 + (1 - \{1 + K_z(Y)\}C_s(Y)^2 Z^2)]} +$$
$$(f_0 + f_1 Y + f_2 Y^2 + f_3 Y^3 + f_4 Y^4 + f_5 Y^5 + \ldots)z +$$
$$(g_0 + g_1 Y + g_2 Y^2 + g_3 Y^3 + g_4 Y^4 + g_5 Y^5 + \ldots)z^2 +$$
$$(h_0 + h_1 Y + h_2 Y^2 + h_3 Y^3 + h_4 Y^4 + h_5 Y^5 + \ldots)z^3 +$$
$$(i_0 + i_1 Y + i_2 Y^2 + i_3 Y^3 + i_4 Y^4 + i_5 Y^5 + \ldots)z^4 +$$
$$(j_0 + j_1 Y + j_2 Y^2 + j_3 Y^3 + j_4 Y^4 + j_5 Y^5 + \ldots)z^5 +$$
$$(k_0 + k_1 Y + k_2 Y^2 + k_3 Y^3 + k_4 Y^4 + k_5 Y^5 + \ldots)z^6 +$$
$$(l_0 + l_1 Y + l_2 Y^2 + l_3 Y^3 + l_4 Y^4 + l_5 Y^5 + \ldots)z^7 +$$
$$(m_0 + m_1 Y + m_2 Y^2 + m_3 Y^3 + m_4 Y^4 + m_5 Y^5 + \ldots)z^8 +$$
$$(n_0 + n_1 Y + n_2 Y^2 + n_3 Y^3 + n_4 Y^4 + n_5 Y^5 + \ldots)z^9 +$$
$$(o_0 + o_1 Y + o_2 Y^2 + o_3 Y^3 + o_4 Y^4 + o_5 Y^5 + \ldots)z^{10} + \ldots$$

In the above formula (2), $C_s(Y)$ and $K_z(Y)$ are given by the following formulas (2A) and (2B);

$$C_s(Y) = C_{s0} + b_1 Y + b_2 Y^2 + b_3 Y^3 + b_4 Y^4 + b_5 Y^5 + \ldots \quad (2A)$$
$$K_z(Y) = C_o + c_1 Y + c_2 Y^2 + c_3 Y^3 c_4 Y^4 + c_5 Y^5 + \ldots \quad (2B)$$

In the above formulas (2), (2A) and (2B), only X, Y and Z are variables and the others are coefficients or constants and are given as a design value, respectively.

In the above formula (2), the part of the formula $$C_{m0}Y^2 / \sqrt{[1 + \{1 - (1 + a_0)C_{m0}^2 Y^2\}]} + a_1 Y + a_3 Y^3 + a_4 Y^4 + a_5 Y^5 \ldots$$

defines the non-arc shape of the beam position correcting lens surface in the main scanning cross section, and $C_{mo}$ is 1/$R_{m6}$=−1/700, representing a paraxial radius of curvature in the main scanning cross section. Further, the part of the formula (2)

$$C_s(0)Z^2 / \sqrt{[1 + (1 - \{1 + K_z(0)\}C_s(0)^2 Z^2)]} +$$
$$(f_0 z + g_0 Z^2 + h_0 Z^3 + i_0 Z^4 + j_0 Z^5 + k_0 Z^6 + \ldots$$

represents the non-arc shape of the beam waist position correcting lens surface in the sub scanning cross section (the XZ plane) at the position Y=0 in the Y coordinate, and $C_{s0}$ is 1/$R_{s6}$=−1/24.42, representing a paraxial radius of curvature in the XZ plane. $C_s(Y)$ represents a paraxial radius of curvature in the sub scanning cross section in the coordinate Y, and $K_z(Y)$ is the cone constant of the non-arc shape in the sub scanning cross section in the Y coordinate.

In the formula (2), when the coefficients having a suffix, a, b, c, f, g, h, i, j, k, l, m, n, . . . , are set to zero, respectively, except the coefficients a and b, the lens surface expressed by the formula (2) has an arc shape in an arbitrary sub scanning cross section and the radius of curvature center line plotting a center of a radius of curvature is formed in a curved line in the direction corresponding to the main scanning direction (i.e., the Y direction), which is defined by the coefficients $b_1$, $b_2$, $b_3$, $b_4$. This curved line has a shape similar to the one indicated by L(Y) in FIGS. 3(a) and 3(b). The coefficient "a" determines the shape of a lens surface in the main scanning cross section. A deviation of the above beam waist position correcting lens surface from an arc shape in the sub scanning cross section (herein referred to as a non-spherical surface correction amount) can be determined independently of a deviation in the direction corresponding to the main scanning direction (the Y direction) by defining the coefficients c, f, g, h, i, j, k, . . . .

The coefficients for defining the shape of the beam waist position correcting lens surface (the sixth surface) in the Example 1 are as follows:

$C_{mo}$=−1.42857E−03 (the reciprocal of $R_m$=−700),
$C_{so}$=−4.095004E−02 (the reciprocal of $R_s$=−24.42), $a_2$=0.0,
$b_2$=−4.329E−08, $b_4$=−3.147E−14, $b_6$=5.909E−18, $b_8$=−2.121E−21,
$b_{10}$=4.329E−25, $b_{12}$=−5.246E−29, $b_{14}$=3.732E−33, $b_{16}$=−1.438E−37, $b_{18}$=2.317E−42,
$C_0$=−1.355E+01, $C_2$=−3.512E−03, $C_4$=−6.736E−06, $C_6$=6.462E−09,
$C_8$=−3.053E−12, $C_{10}$=7.934E−16, $C_{12}$=−1.173E−19, $C_{14}$=9.809E−24,
$C_{16}$=−4.318E−28, $C_{18}$=7.763E−33
$i_0$=−3.173E−04, $i_2$=7.922E−09, $i_4$=1.248E−11, $i_6$=2.755E15,
$i_8$=−4.610E−18, $i_{10}$=1.453E−21, $i_{12}$=−2.177E−25, $i_{14}$=1.751E−29,
$i_{16}$=7.291E−34, $i_{18}$=1.237E−38,
$k_0$=1.480E−04, $k_2$=−1.109E−08, $k_4$=−4.538E−12, $k_6$=−5.578E−15,
$k_8$=2.217E−18, $k_{10}$=−8.068E−23, $k_{12}$=−6.194E−26, $k_{14}$=1.038E−2
$k_{16}$=−6.411E−34, $k_{18}$=1.419E−38,
$m_0$=−3.881E−05, $m_2$=8.516E−10, $m_4$=−4.024E−12, $m_6$=6.480E−15,
$m_8$=−2.067E−18, $m_{10}$=2.001E−22, $m_{12}$=1.233E−26, $m_{14}$=−3.753E−30,
$m_{16}$=2.575E−34, $m_{18}$=−5.928E−39,
$o_0$=3.728E−06, $o_2$=3.281E−10, $o_4$=7.944E−13, $o_6$=−1.078E−15,
$o_8$=3.619E−19, $o_{10}$=−4.864E−23, $o_{12}$=1.740E−27, $o_{14}$=2.015E−31,
$o_{16}$=−2.051E−35, $o_{18}$=5.309E−40

The paraxial radius of curvature center line plotting a center of a paraxial radius of curvature in the direction corresponding to the main scanning direction (the Y direction) in the sub scanning cross section curves in a symmetrical manner relative to the direction corresponding to the main scanning direction, that is, symmetrically relative to the Y coordinate, because the coefficient "b" includes only even order terms which are infinite and does not include odd order terms.

Figure 4A:
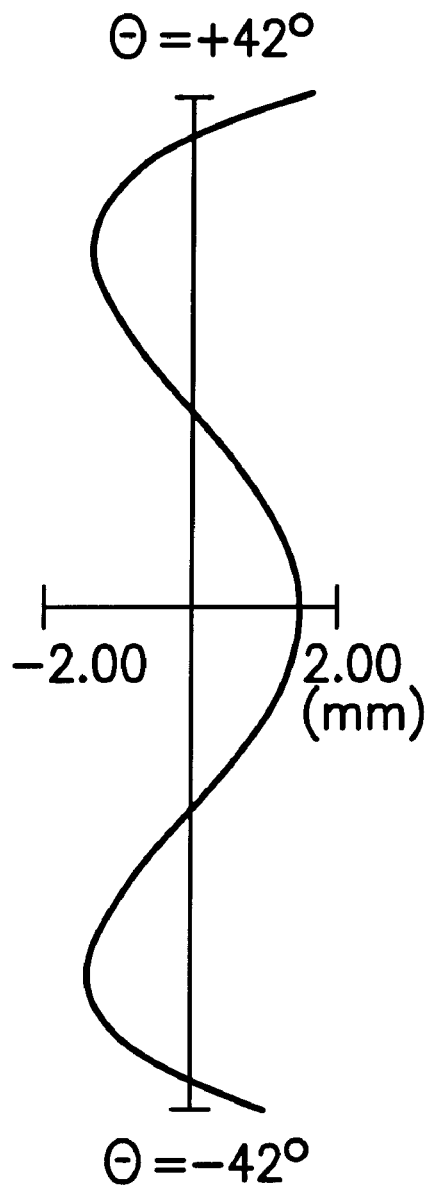
FIGS. 4($a$) and 4($b$) are diagrams illustrating an example of a paraxial curvature of field in a sub scanning direction and constant velocity characteristics (linearity) relating a first example of a preferred embodiment of the present invention.
Figure 4B:
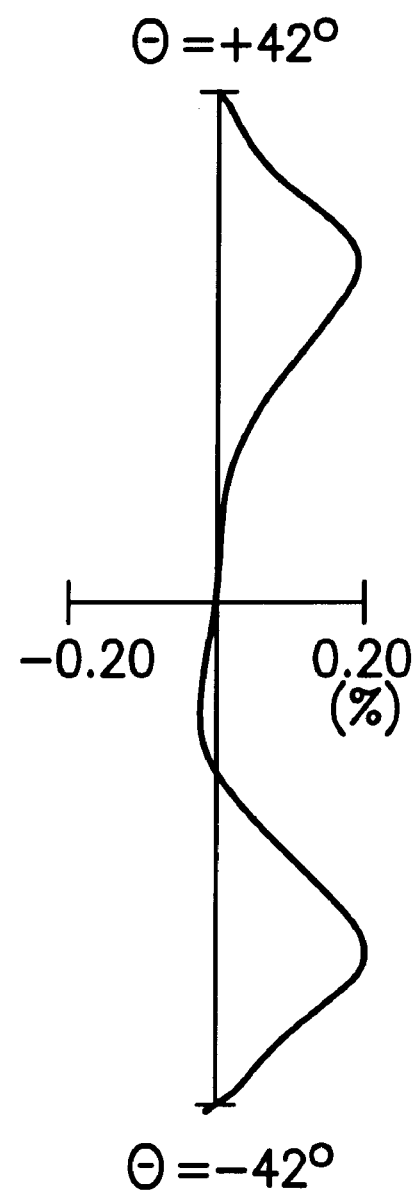

FIGS. 4(a) and 4(b) are diagrams illustrating a paraxial curvature of field in the sub scanning direction and constant velocity characteristics (linearity) relating to Example 1. The maximum width of the curvature of field in the sub scanning direction is preferably about 3.09 mm.

Figure 5:
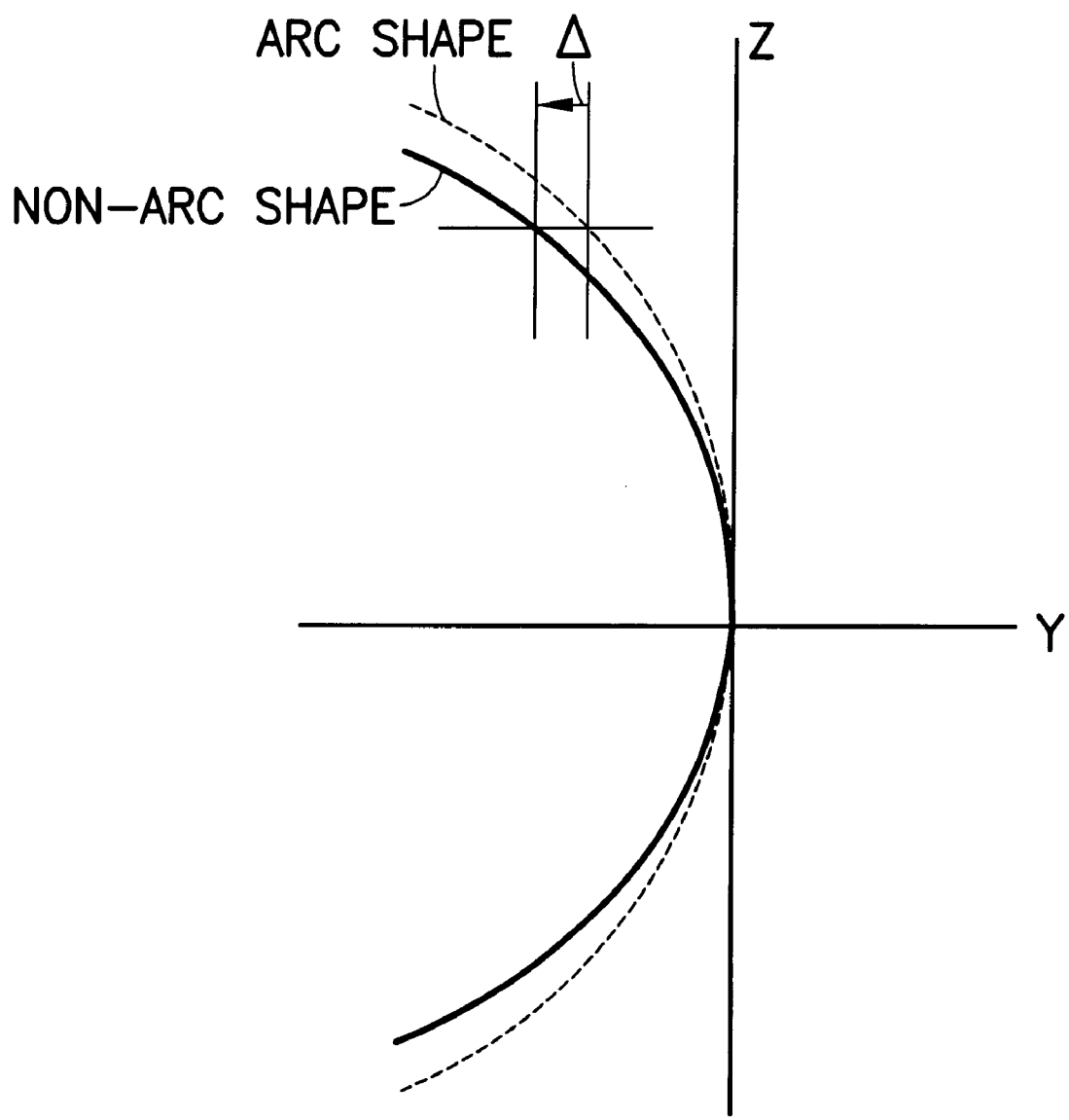
FIG. 5 is a diagram for explaining a deviation from a circular arc of a beam waist position correcting lens surface, which is has a non-arc shape in a sub scanning cross section.

In the Example 1, the non-spherical surface correction amount Δ in the sub scanning cross section is symmetrical relative to the optical axis in the direction approximately parallel to the main scanning direction (in plus and minus directions relative to the Y axis) and changes in the main scanning direction as indicated by the following table 1 and illustrated in FIG. 5:

TABLE 1

| Y | Z = 0 | Z = 0.6 | Z = 1.2 | Z = 1.45 | Z = 1.988 |
|---|---|---|---|---|---|
| 112.53 | 0 | −0.01 | −0.10 | −0.28 | −1.77 |
| 98.01 | 0 | −0.02 | −0.31 | −0.73 | −3.42 |
| 83.64 | 0 | −0.02 | −0.29 | −0.67 | −3.05 |
| 69.38 | 0 | −0.01 | −0.25 | −0.58 | −2.72 |
| 55.23 | 0 | −0.01 | −0.15 | −0.37 | −1.84 |
| 41.17 | 0 | 0.00 | −0.04 | −0.17 | −1.03 |
| 27.17 | 0 | 0.01 | 0.05 | 0.00 | −0.48 |
| 13.21 | 0 | 0.02 | 0.11 | 0.11 | −0.14 |
| −0.71 | 0 | 0.02 | 0.12 | 0.13 | −0.06 |
| −13.21 | 0 | 0.02 | 0.11 | 0.11 | −0.14 |
| −27.17 | 0 | 0.01 | 0.05 | 0.00 | −0.48 |
| −41.17 | 0 | 0.00 | −0.04 | −0.17 | −1.03 |
| −55.23 | 0 | −0.01 | −0.15 | −0.37 | −1.84 |
| −69.38 | 0 | −0.01 | −0.25 | −0.58 | −2.72 |
| −83.64 | 0 | −0.02 | −0.29 | −0.67 | −3.05 |
| −98.01 | 0 | −0.02 | −0.31 | −0.73 | −3.42 |
| −112.53 | 0 | −0.01 | −0.10 | −0.28 | −1.77 |

In the above table 1, the non-spherical surface correction amount Δ is expressed in the unit of μm and the unit of the Y and Z coordinates is in millimeters.

Figure 6:
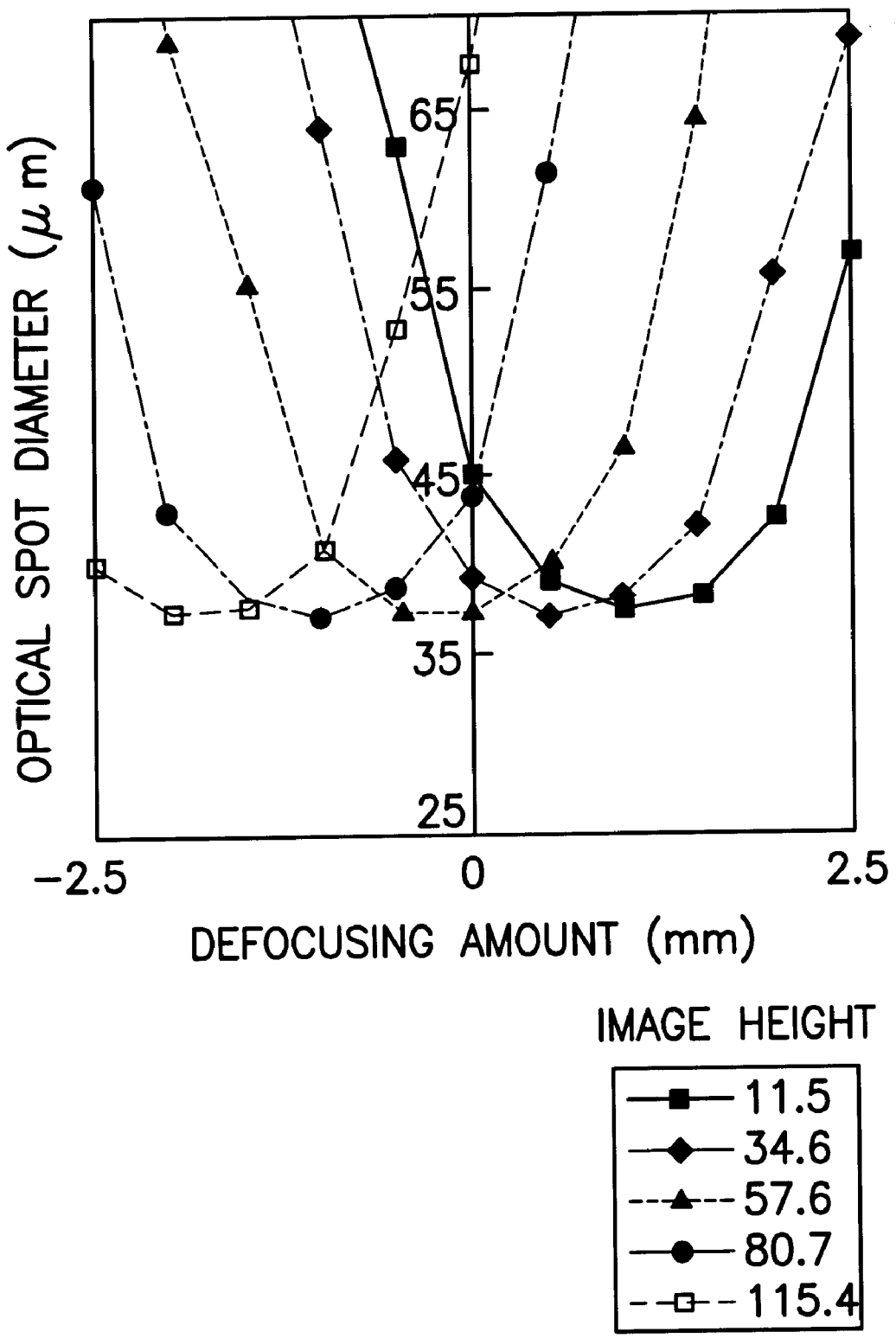
FIG. 6 is a diagram illustrating a change in the optical beam spot diameter in a sub scanning direction according to an image height relative to each of a plurality of defocusing amounts when the beam waist position correcting lens surface has an arc shape in the sub scanning cross section in the preferred embodiment, i.e., when a non-spherical surface correction amount (an amount required to correct a non-arc shape to an arc shape) is not applied to the beam waist position correcting lens surface in the first example of the preferred embodiments.
Figure 7:
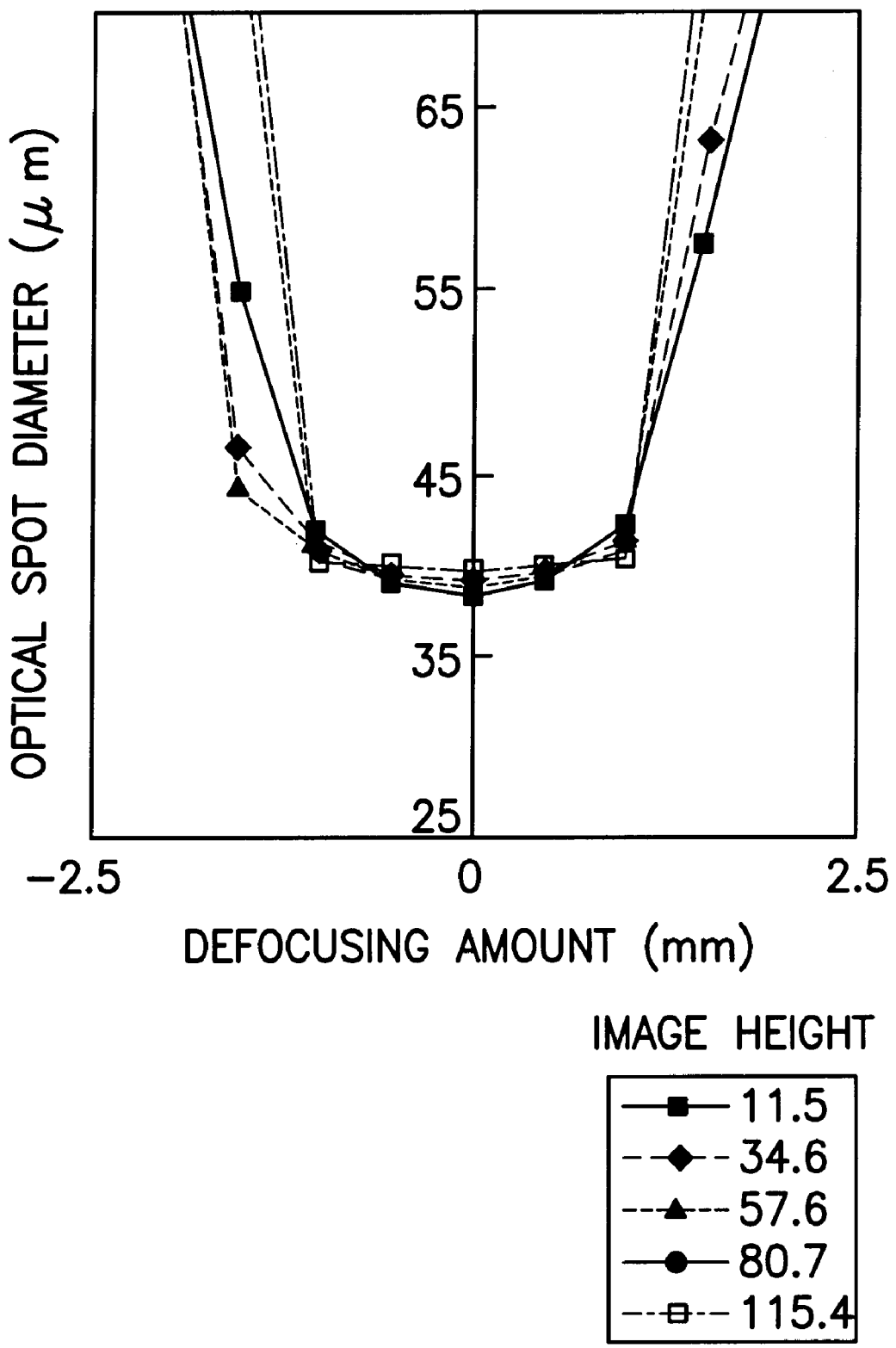
FIG. 7 is a diagram illustrating a change in the optical beam spot diameter in the sub scanning direction according to an image height relative to each of a plurality of defocusing amounts when the non-spherical surface correction amount is applied to the beam waist position correcting lens surface in the first example of the preferred embodiments.

FIGS. 6 and 7 are diagrams illustrating, respectively, a change in the optical beam spot diameter in the sub scanning direction relative to each defocusing amount before and after applying the above-described non-spherical surface correction amount Δ to the beam waist position correcting lens surface. The coefficients a, b, c, f, g, h, i, j, k, l, m, n, . . . are set to zero, except the coefficients a and b, and the lens surface is formed to have an arc shape in an arbitrary sub scanning cross section and the radius of curvature center line plotting a center of a radius of curvature is formed in a curved line, which is defined by the series of the coefficient b, in the direction corresponding to the main scanning direction (i.e., the Y direction). The paraxial curvature of field in the sub scanning cross section illustrated in FIG. 4(a) does not change before and after applying the spherical correcting amount Δ because the curvature of field is caused in a geometric-optic manner.

As illustrated in FIG. 6, when a lens surface of a scanning image forming lens has an arc shape in the sub scanning cross section, the beam waist position of a luminous flux passed through the scanning image forming lens shifts in a minus or plus direction relative a surface to be scanned according to the curvature of field of the scanning image forming lens in the sub scanning direction. Therefore, the diameter of an optical beam spot, which is formed by the luminous flux on the surface to be scanned (at the position of the vertical axis in FIG. 6), significantly changes in the sub scanning direction, according to the position in the main scanning direction, i.e., according to the image height of the optical beam spot.

When the lens surface of the scanning image forming lens has a non-arc shape in the sub scanning cross section and the non-arc shape is formed so as to change in the main scanning direction according to the position in the main scanning direction (the Y coordinate), as in Example 1, the wave-front aberration on the surface to be scanned in the direction corresponding to the sub scanning direction is suppressed regardless of the position in the main scanning direction.

Thus, the beam waist position of a luminous flux passed through a scanning image forming lens, which is changed according to the image height due to the paraxial curvature of field of the scanning image forming lens in the sub scanning direction, is maintained in substantially the same position relative to a surface to be scanned, and thereby, a change in the diameter of an optical beam spot which is formed on the surface to be scanned by the luminous flux in the sub scanning direction according to the image height, is suppressed over the entire surface to be scanned.

Figure 8:
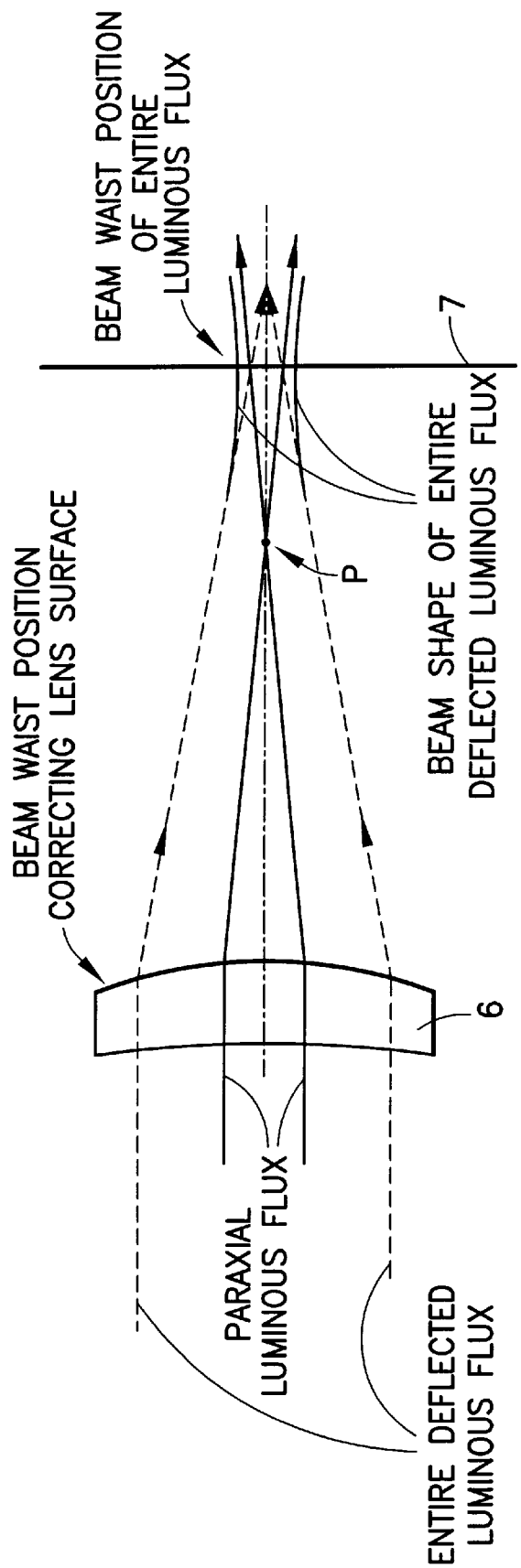
FIG. 8 is a schematic drawing for explaining how a beam waist position of an entire deflected luminous flux can be positioned close to a surface to be scanned in the sub scanning direction by changing a non-arc shape of the beam waist position correcting lens surface in the sub scanning cross section according to the position in the main scanning direction.

FIG. 8 is a schematic drawing for more specifically explaining, from a geometric-optic view, that a beam waist position of an entire deflected luminous flux can be positioned close to a surface to be scanned in the sub scanning direction by changing a non-arc shape of a beam waist position correcting lens surface in the sub scanning cross section according to the position in the main scanning direction.

In FIG. 8, numeral 7 denotes a surface to be scanned, and numeral 6 denotes a lens having a beam waist position correcting lens surface at the side of the surface to be scanned 7. The vertical direction in FIG. 8 corresponds to the direction corresponding to the sub scanning direction. A paraxial luminous flux is indicated by solid lines in FIG. 8.

Assuming that the image forming position of the paraxial luminous flux in the direction corresponding to the sub scanning direction is caused to be shifted to a point "P" due to a paraxial curvature of field of the lens 6, the beam waist of a beam corresponding to the paraxial luminous flux is positioned near the point P, deviated from the surface to be scanned 7. Because of this deviation of the point P from the surface to b e scanned 7, the diameter of an optical beam spot on the surface to be scanned 7 changes in the sub scanning direction according to the image height depending upon the paraxial curvature of field in the sub scanning direction. However, by correcting the direction of the luminous flux passed through the peripheral portion of the lens 6 by means of the non-arc shape in the sub scanning cross section, the beam waist position of the entire luminous flux (indicated by dotted lines) can be positioned on the surface to be scanned 7, regardless of the existence of the paraxial curvature of field.

That is, the beam waist position of an entire deflected luminous flux with respect to the sub scanning direction can be always positioned close to a surface to be scanned by changing a non-arc shape of the beam waist position correcting lens surface in the sub scanning cross section according to the position in the direction corresponding to the main scanning direction (the Y direction) so as to be optimized for each position in the main scanning direction (image height of an optical beam spot), and thereby any change in the diameter of the optical beam spot in the sub scanning direction according to the image height is suppressed and corrected.

As illustrated in FIG. 7, in Example 1, the diameter of an optical beam spot in the sub scanning direction does not change according to the image height at the position of the vertical axis of the diagram, which corresponds to the position of the surface to be scanned in the design of the optical scanning apparatus. Further, the diameter of the optical beam spot does not change even at a defocused position (i.e., a position deviated from the designed position for the surface to be scanned) along the entire area of the surface to be scanned (the entire area indicated by an image height). That is, the diameter of the optical beam spot is maintained substantially constant over the entire area of the surface to be scanned. The beam waist position correcting lens surface functions to increase the depth of the image forming position (defocusing tolerance) with respect to the sub scanning direction. Accordingly, the change in the diameter of an optical beam spot in the sub scanning direction can be suppressed within an assembling tolerance of a surface to be scanned relative to a scanning image forming lens.

Typically, a mechanical placement error tolerance relative to a designed position for a surface to be scanned is in a range of plus and minus 0.5 mm of the designed position in digital copiers and laser printers. In Example 1, when the placement error tolerance of a surface to be scanned is set to a range of plus and minus 0.5 mm relative to a designed position, the change in the diameter of the optical beam spot is maintained within 4.4% of a design value of about 39.3 μm as illustrated in FIG. 7.

Figure 9A:
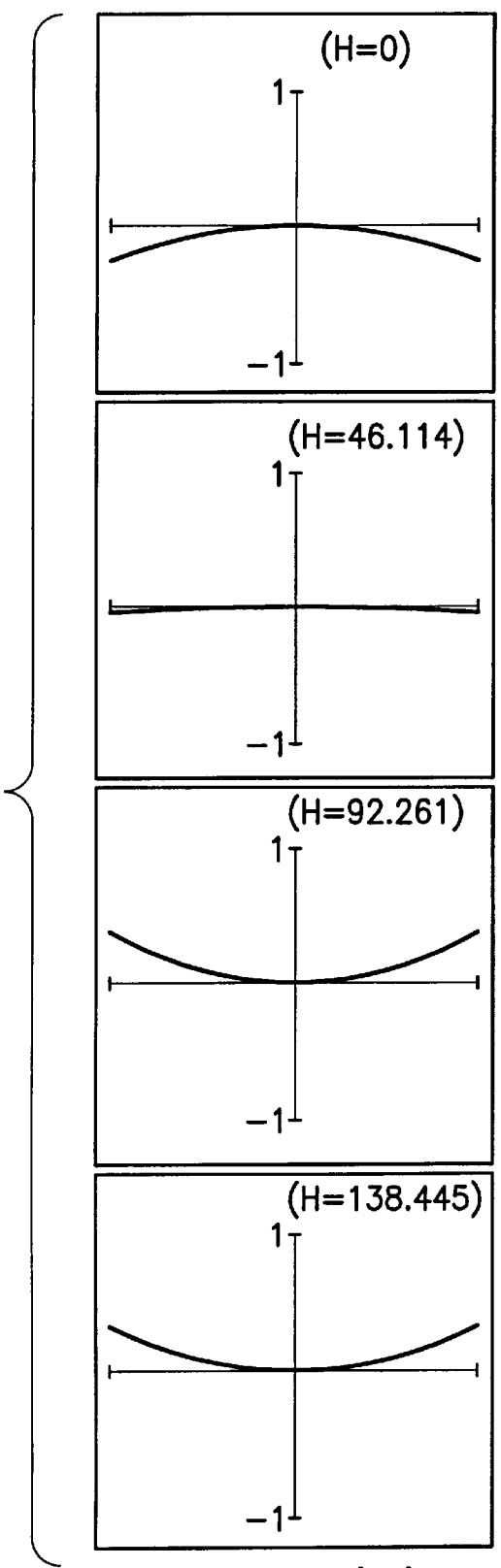
FIG. 9 is a diagram illustrating a wave-front aberration of the scanning image forming lens system in the first example of the preferred embodiments, at various image heights, before and after applying the non-spherical surface correction amount to the beam waist position correcting surface.
Figure 9B:
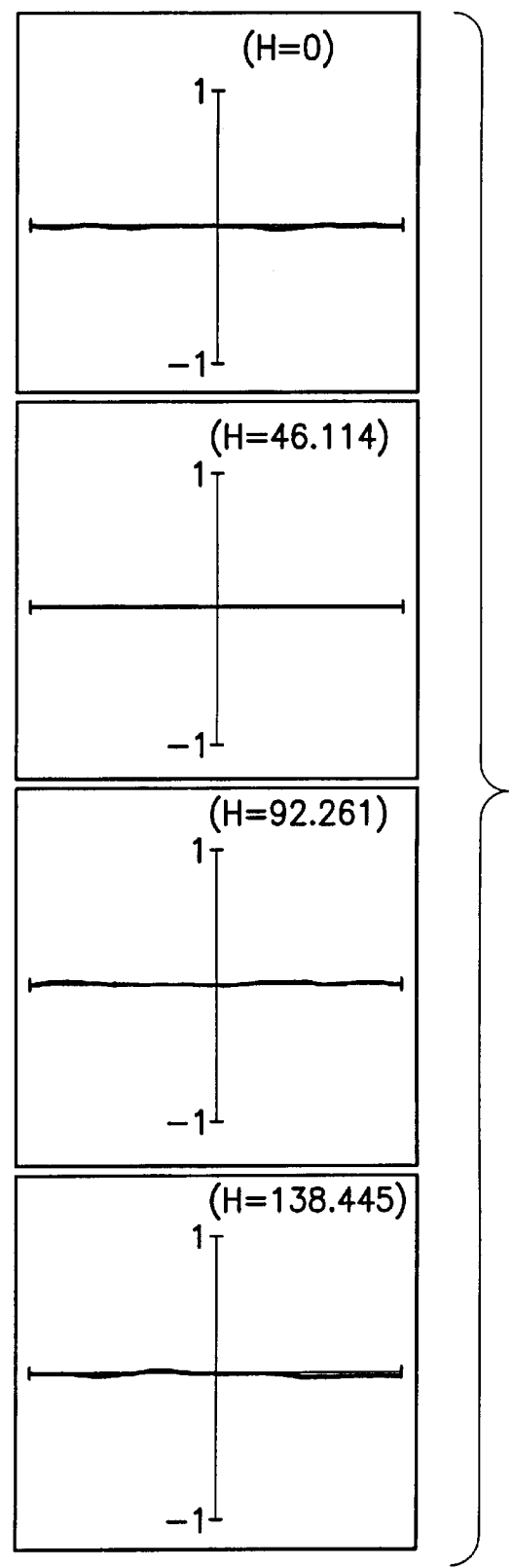

FIGS. 9(a) and 9(b) are diagrams respectively illustrating a change in the wave-front aberration, at various image heights, before and after applying the above-described non-spherical surface correction amount Δ to the beam waist position correcting lens surface.

As illustrated in FIG. 9(b), the wave-front aberration is corrected accurately and excellently when the non-spherical surface correction amount Δ is applied to the beam waist position correcting lens surface.

Now, another example of the scanning image forming lens according to the preferred embodiments of the present invention is described as Example 2.

EXAMPLE 2

Data of the Example 2 is shown below:

| i | $R_{mi}$ | $R_{si}$ | $D_i$ | J | $N_j$ |
|---|---|---|---|---|---|
| 0 | | | 50.9 | | |
| 1 | −96.76 | −96.76 | 15.07 | 1 | 1.78571 |
| 2 | −93.27 | −93.27 | 9.76 | | |
| 3 | −2450.2 | −2450.2 | 19.9 | 2 | 1.60909 |
| 4 | −161.76 | −161.76 | 127.0 | | |
| 5 | −630.0 | −56.36 | 3.0 | 3 | 1.57211 |
| 6 | −700.0 | −24.42 | | | |

The lenses 5A and 5A are substantially the same as the ones used in Example 1. Also, the lens surface of the lens 6 facing a surface to be scanned (the sixth surface) is configured so as to function as the beam waist position correcting lens surface. The lens surface of the lens 6 at the side of the polygonal mirror (the fifth surface) is formed in a shape expressed by the following part of the formula (2):

$$X(Y) = C_{m0}Y^2 \Big/ \sqrt{[1 + \{1 - (1+a_0)C_{m0}^2 Y^2\}]} + a_1 Y + a_3 Y^3 + a_4 Y^4 + a_5 Y^5 \ldots,$$

in the main scanning cross section. The shape in the sub scanning cross section is preferably non-arc and the change of the non-arc shape in the main scanning direction (the Y direction) is expressed by the formula (2A):

$$C_s(Y) = C_{s0} + b_1 Y + b_2 Y^2 + b_3 Y^3 + b_4 Y^4 + b_5 Y^5 + \ldots$$

The coefficients and constants for defining the shape of the fifth surface are as follows:

$C_{m0}$=−1.58730E−03 (the reciprocal of $R_m$=−630),
$C_{s0}$=−1.77428E−02 (the reciprocal of $R_s$=−56.360),
$a_0$=−31.4046, $a_4$=−2059E−09, $a_6$=1.839E−14, $a_8$=6.366E−18,
$a_{10}$=−8.922E−22, $a_{12}$=6.466E−26, $a_{14}$=−1.339E−30, $a_{16}$=−1.058E−34,
$a_{18}$=4.413E−39,
$b_2$=−4.288E−07, $b_4$=1.926E−11, $b_6$=−1.496E−15, $b_8$=1.151E−19, $b_{10}$=−3.610E−24, The coefficients and constants for defining the shape of the sixth surface are as follows:

$C_{m0}$=−1.42857E−03 (the reciprocal of $R_m$=−700),
$C_{s0}$=4.0950E−02 (the reciprocal of $R_s$=−24.42),
$b_2$=−4.329E−08, $b_4$=−3.147E−14, $b_6$=−5.909E−18, $b_8$=−2.121E−21,
$b_{10}$=4.329E−25, $b_{12}$=−5.246E−29, $b_{14}$=3.732E−33, $b_{16}$=−1.438E−37,
$b_{18}$=2.317E−42,
$C_0$=−5.901E−02, $C_1$=−2.791E−02, $C_2$=1.090E−03, $C_3$=2.420E−05,
$C_4$=−6.912E−08, $C_5$=−4.779E−09, $C_6$=−1.759E−11, $C_7$=3.523E−13,
$C_8$=2.215E−15, $C_9$=−8.845E−18, $C_{10}$=−6.771E−20,
$i_0$=3.411E−05, $i_1$=4.931E−09, $i_2$=1.327E−09, $i_3$=1.225E−10,
$i_4$=1.193E−12, $i_5$=−2.944E−14, $i_6$=−4.081E−16, $i_7$=2.141E−18,
$i_8$=3.634E−20, $i_9$=−4.965E−23, $i_{10}$=−1.012E−24,
$k_0$=−4.206E−06, $k_1$=−4.654E−08, $k_2$=1.468E−09, $k_3$=2.135E−11,
$k_4$=−2.370E−13, $k_5$=−3.410E−15, $k_6$=1.955E−17, $k_7$=2.555E−19,
$k_8$=−5.499E−22, $k_9$=−7.124E−24, $k_{10}$=−2.006E−27

The curvature center line plotting a curvature center (a paraxial curvature center at the fifth surface) in the sub scanning cross section is formed symmetrically relative to the Y coordinate at both of the fifth and sixth surfaces because the series of the coefficient bare even.

Figure 10A:
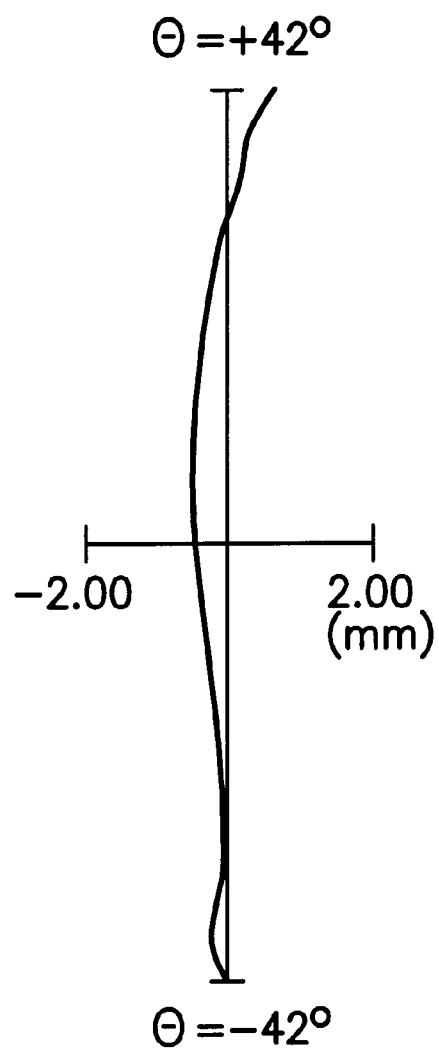
FIGS. 10(a) and 10(b) are diagrams illustrating an example of a paraxial curvature of field in the sub scanning direction and constant velocity characteristics (linearity) relating a second example of preferred embodiments of the present.
Figure 10B:
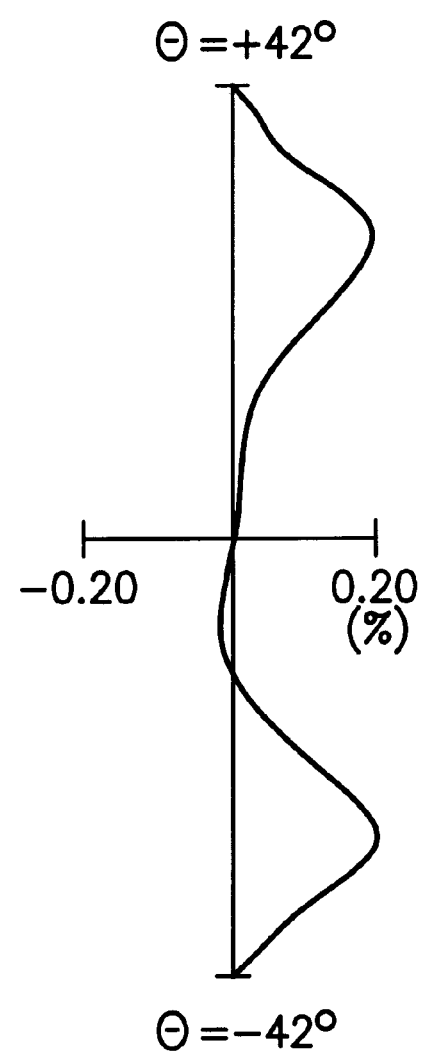

FIGS. 10(a) and 10(b) are diagrams illustrating an example of the paraxial curvature of field in the sub scanning direction and the constant velocity characteristics (linearity) of Example 2. The maximum width of the paraxial curvature of field is about 1.07 mm. The paraxial curvature of field is corrected more accurately than the Example 1.

In Example 2, the non-spherical surface correcting amount A for the non-arc shape in the sub scanning cross section is asymmetrical relative to the optical axis in the main scanning direction, which is indicated in the following Table 2 in substantially the same manner as in the Example 1:

TABLE 2

| Y | Z = 0 | Z = 0.6 | Z = 1.2 | Z = 1.45 | Z = 2.10 | Z = 3.00 |
|---|---|---|---|---|---|---|
| 118.42 | 0 | 0.00 | 0.02 | 0.03 | 0.00 | −0.98 |
| 112.57 | 0 | 0.00 | 0.01 | 0.01 | −0.05 | −1.20 |
| 98.04 | 0 | 0.00 | 0.00 | −0.01 | −0.12 | −1.01 |
| 83.66 | 0 | 0.00 | −0.02 | −0.04 | −0.21 | −0.94 |
| 69.41 | 0 | 0.00 | −0.03 | −0.07 | −0.28 | −0.87 |
| 55.25 | 0 | 0.00 | −0.05 | −0.09 | −0.31 | −0.60 |
| 41.18 | 0 | 0.00 | −0.05 | −0.10 | −0.32 | −0.17 |
| 27.17 | 0 | 0.00 | −0.06 | −0.11 | −0.32 | 0.21 |
| 13.22 | 0 | 0.00 | −0.06 | −0.12 | −0.32 | 0.35 |
| −0.71 | 0 | 0.00 | −0.06 | −0.11 | −0.31 | 0.25 |
| −13.22 | 0 | 0.00 | −0.05 | −0.10 | −0.30 | 0.03 |
| −27.17 | 0 | 0.00 | −0.04 | −0.09 | −0.27 | −0.24 |
| −41.18 | 0 | 0.00 | −0.04 | −0.07 | −0.25 | −0.45 |
| −55.25 | 0 | 0.00 | −0.03 | −0.06 | −0.23 | −0.55 |
| −69.41 | 0 | 0.00 | −0.03 | −0.06 | −0.22 | −0.56 |
| −83.66 | 0 | 0.00 | −0.03 | −0.05 | −0.20 | −0.55 |
| −98.04 | 0 | 0.00 | −0.02 | −0.05 | −0.20 | −0.66 |
| −112.57 | 0 | 0.00 | −0.03 | −0.05 | −0.23 | −0.88 |
| −118.42 | 0 | 0.00 | −0.02 | −0.05 | −0.21 | −0.84 |

Figure 11:
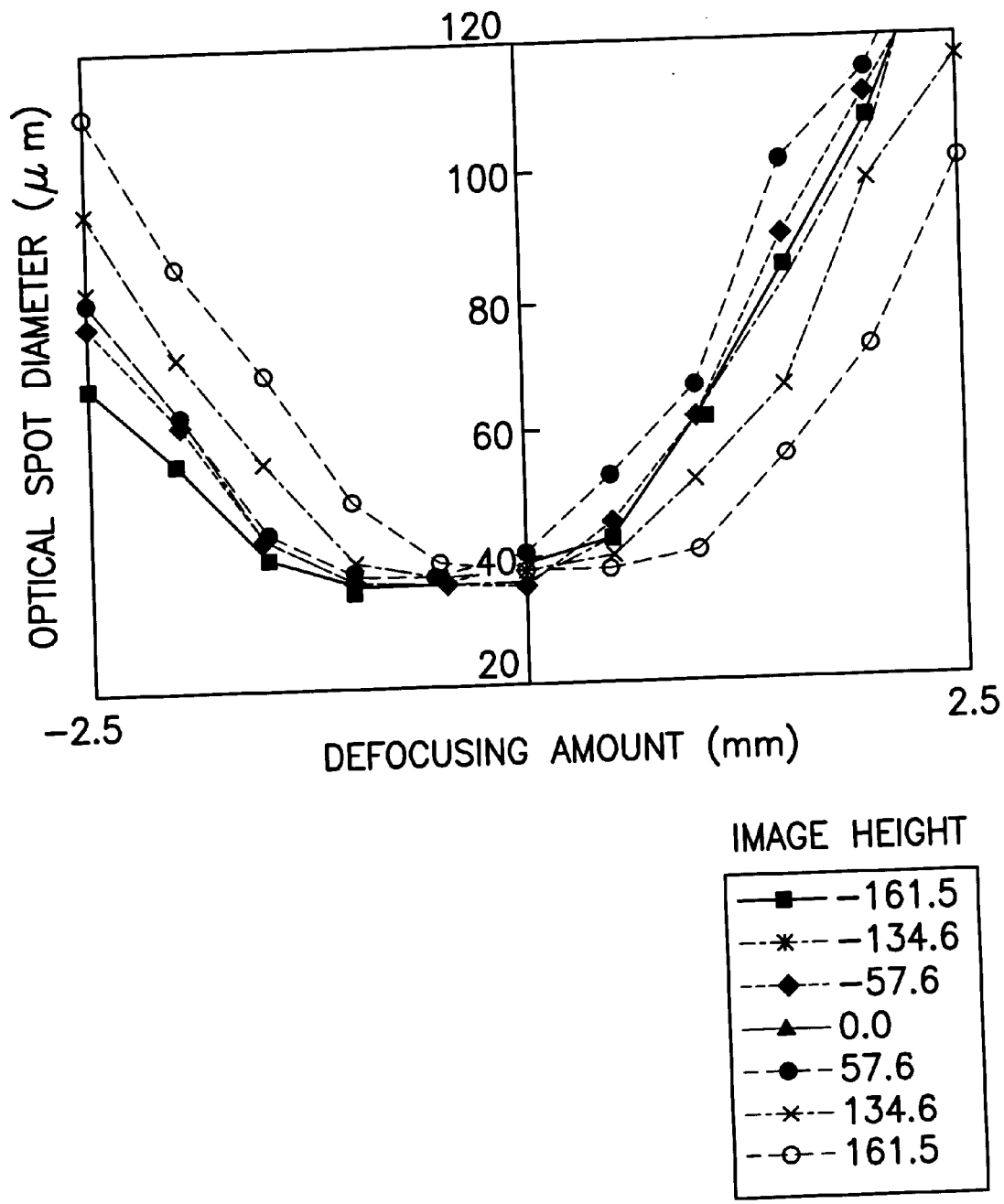
FIG. 11 is a diagram illustrating a change in the optical beam spot diameter in the sub scanning direction according to an image height relative to each of a plurality of defocusing amounts when the beam waist position correcting lens has an arc shape in the sub scanning cross section in the second example of the preferred embodiments, i.e., when a non-spherical surface correction amount (an amount to correct a non-arc shape to an arc shape) is not applied to the beam waist position correcting lens surface in the second example of the preferred embodiments.
Figure 12:
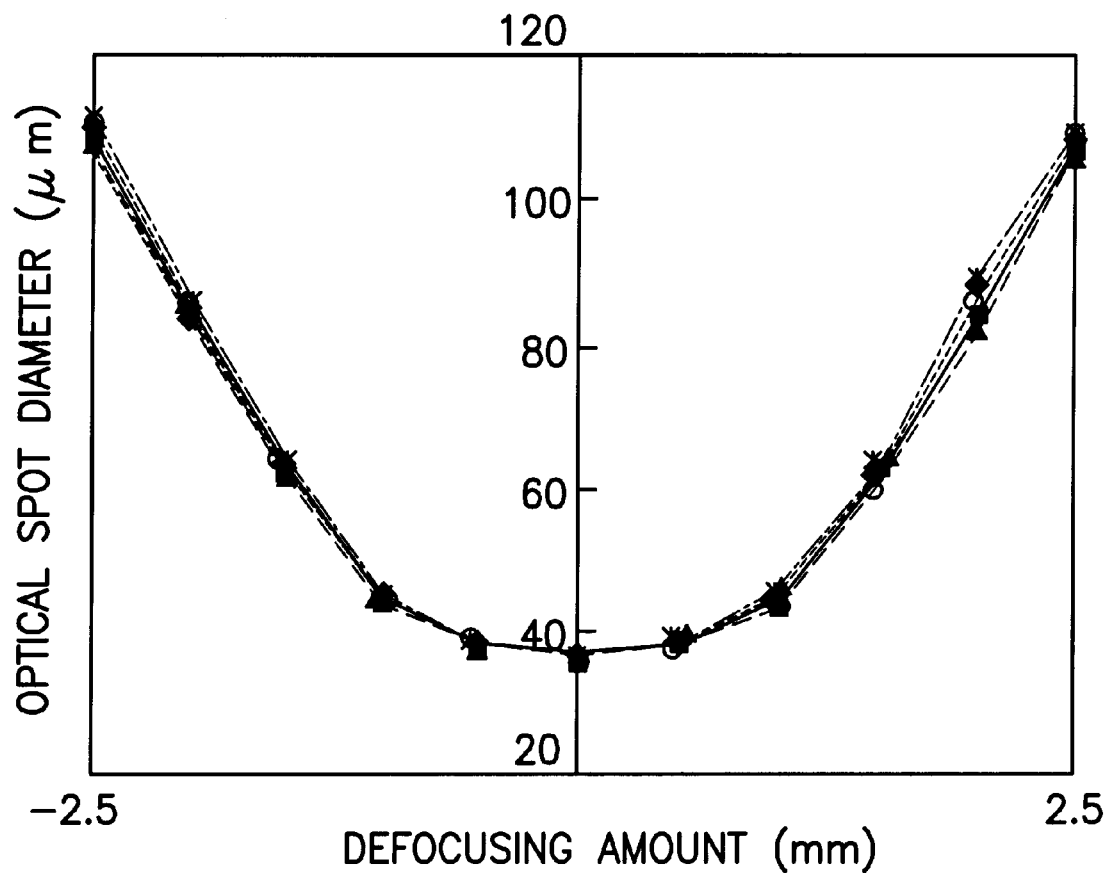
FIG. 12 is a diagram illustrating a change in the optical beam spot diameter in the sub scanning direction according to an image height relative to each defocusing amount when the non-spherical surface correction amount is applied to the beam waist position correcting lens surface in the second example of the preferred embodiments.

FIGS. 11 and 12 are diagrams illustrating, respectively, a change in the optical beam spot diameter in the sub scanning direction relative to each defocusing amount before and after applying the above-described non-spherical surface correction amount A to the beam waist position correcting lens surface (the sixth surface).

As illustrated in FIG. 11, in Example 2, even when the sixth surface is formed to have an arc shape in the sub scanning cross section, the diameter of an optical beam spot does not significantly change according to the image height in the sub scanning direction at the designed position of the surface to be scanned (the position of the vertical axis in FIG. 11). For example, in FIG. 11, the change in the optical beam spot diameter is within plus and minus 10% of the design value of about 37.3 μm. This is enabled by the paraxial curvature of field being corrected accurately and completely in the sub scanning direction in Example 2 as illustrated in FIG. 10.

However, as illustrated in FIG. 11, when the position of the surface to be scanned deviates from a designed position due to an assembly error of the surface to be scanned, the diameter of the optical beam spot in the sub scanning direction changes according to the image height except at an area where the defocusing amount is small. For example, when the assembling tolerance of the surface to be scanned is plus and minus 5 mm of a designed position, the optical beam spot diameter changes about 45% relative to the design value of about 37.3 μm.

In contrast, when the non-spherical surface correcting amount Δ is applied to the beam waist position correcting lens surface, the wave-front aberration on the surface to be scanned is minimized in the direction corresponding to the sub scanning direction regardless of the position in the main scanning direction by adjusting the non-spherical surface correcting amount Δ, and thereby, the beam waist position of an entire luminous flux passed through the scanning image forming lens can be positioned at the surface to be scanned along the entire surface of the surface to be scanned.

That is, as illustrated in FIG. 12, the diameter of an optical beam spot in the sub scanning direction does not change according to the image height at the position of the vertical axis of the diagram, which corresponds to the designed position of the surface to be scanned. Further, the diameter of the optical beam spot in the sub scanning direction does not change according to the image height even at a defocused position (i.e., a position deviated from a designed position of the surface to be scanned). Thus, the diameter of the optical beam spot maintained constant in the sub scanning direction within a range of the assembling tolerance of the surface to be scanned. For example, as illustrated in FIG. 12, when the deviation of a position of a surface to be scanned from a designed position for the surface to be scanned, caused by a placement error of the surface to be scanned, is assumed to be in a range plus and minus 0.5 mm from the surface to be scanned, the change in the diameter of the optical beam spot is kept within about 7% of a design value of about 37.3 μm.

Figures 13A, 13B:
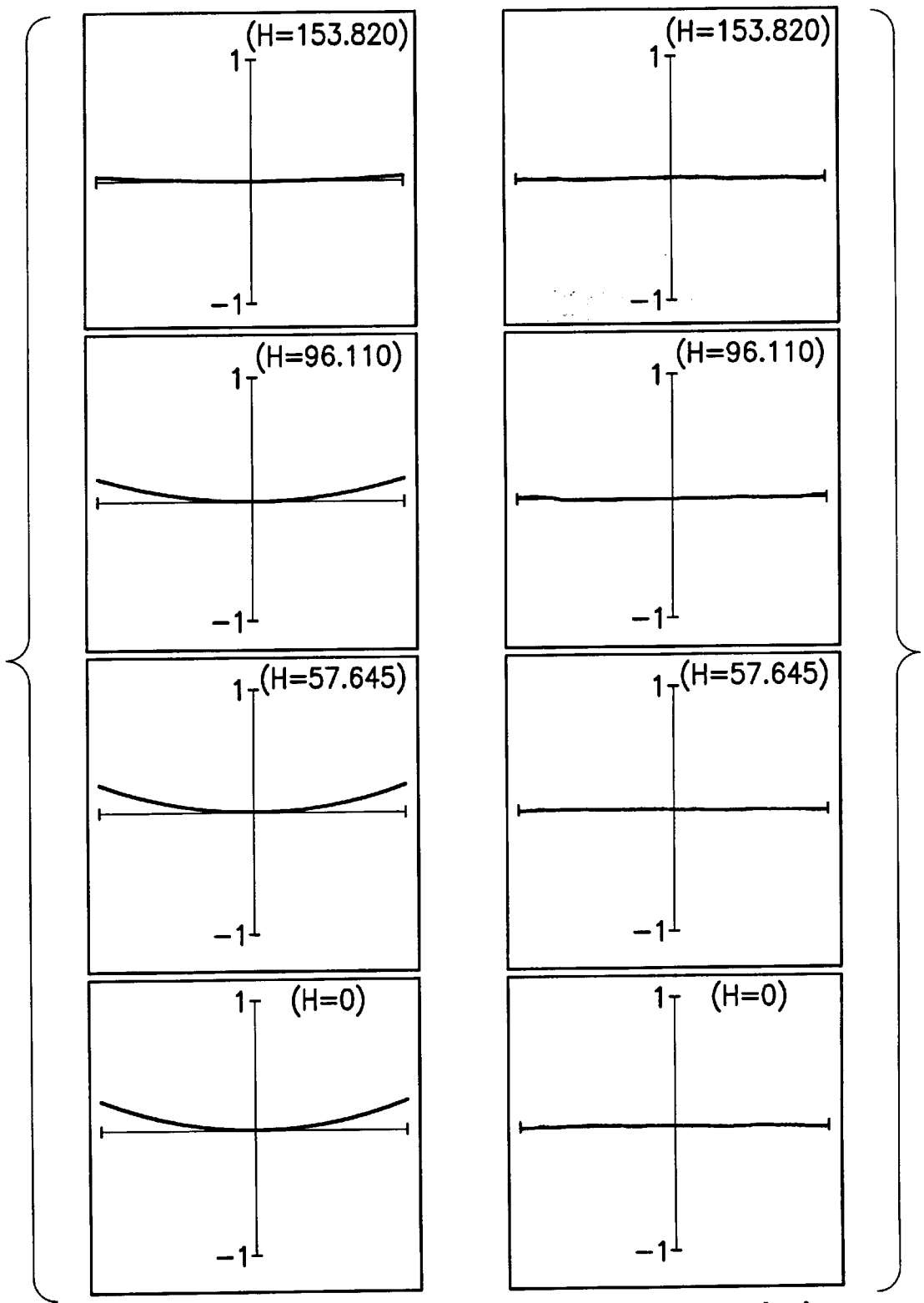
FIG. 13 is a diagram illustrating a wave-front aberration of the scanning image forming lens in the second example of the preferred embodiments, at various image heights on the positive side, before and after applying the non-spherical surface correction amount to the beam waist position correcting surface.
Figures 14A, 14B:
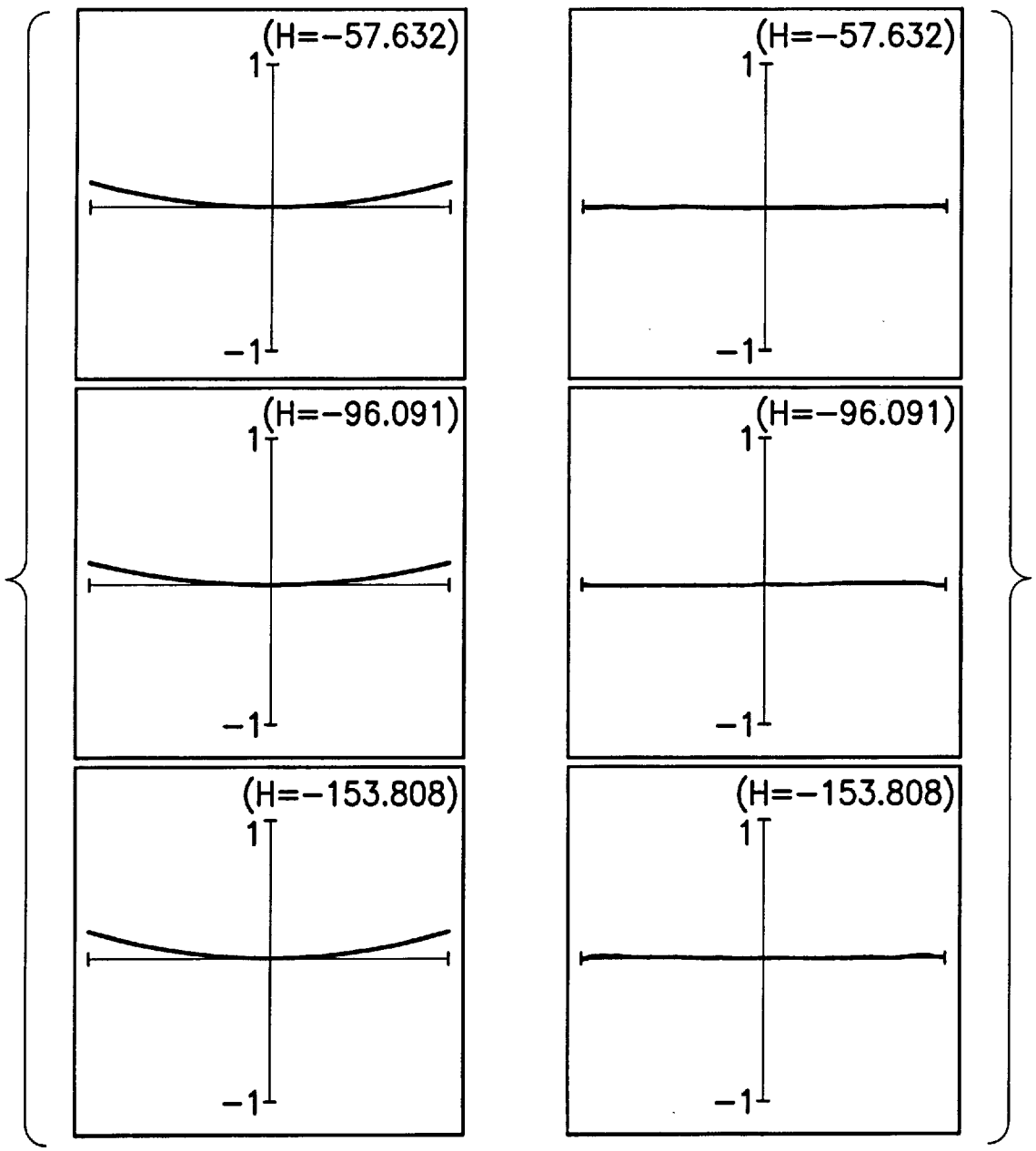
FIG. 14 is a diagram illustrating a wave-front aberration of the scanning image forming lens in the second example of the preferred embodiments, at various image heights on the negative side, before and after applying the non-spherical surface correction amount to the beam waist position correcting surface.

FIGS. 13(a) and 13(b) are diagrams illustrating, respectively, a change in the wave-front aberration on the surface to be scanned in the sub scanning direction in the area where Y≧0 before and after applying the above-described non-spherical surface correction amount Δ to the beam waist position correcting lens surface. FIGS. 14(a) and 14(b) are diagrams illustrating a change in the wave-front aberration on the surface to be scanned in the sub scanning direction in the area where Y<0. As illustrated in the drawings, the wave-front aberration is completely and accurately corrected when the non-spherical surface correction amount Δ is applied to the beam waist position correcting lens surface.

Next, the third example of the scanning image forming lens according to the preferred embodiments of the present invention is described.

EXAMPLE 3

First, data of the Example 3 is shown below;

| i | $R_{mi}$ | $R_{si}$ | $D_i$ | J | $N_j$ |
|---|---|---|---|---|---|
| 0 | | | 50.9 | | |
| 1 | −96.76 | −96.76 | 15.07 | 1 | 1.78571 |
| 2 | −93.27 | −93.27 | 9.76 | | |
| 3 | −2450.2 | −2450.2 | 19.9 | 2 | 1.60909 |
| 4 | −161.76 | −161.76 | 127.0 | | |
| 5 | −630.0 | −56.36 | 3.0 | 3 | 1.57211 |
| 6 | −700.0 | −24.42 | | | |

As indicated above, the data is substantially the same as that of Example 2.

In Example 3, the lens surface of the lens 6 located at the side of the polygonal mirror (the fifth surface) is configured to be the beam waist position correcting lens surface and the lens surface facing the surface to be scanned (the sixth surface) is configured to be a toroidal surface.

A toroidal surface is a curved surface, which is obtained when a shape in the sub scanning cross section, which is expressed by the following formula (3):

$$X = (Z^2/R_s)\Big/\sqrt{[1+\{1-(Z/R_s)^2\}]} \quad (3)$$

wherein X represents the coordinate in the direction of the optical axis, $R_s$ represents a radius of curvature in the sub scanning cross section including the optical axis and Z is the coordinate in the direction corresponding to the sub scanning direction, is rotated around an axis approximately perpendicular to the X axis in the sub scanning cross section at the position which is a distance $R_m$ apart from the position where X=0 on the optical axis (the X axis). In the Example 3, $R_s$=−24.42 and $R_s$=−700.

The beam waist position correcting lens surface formed at the fifth surface is expressed by the above formula (2) with the following coefficients and constants:

$C_{m0}$=−1.58730E−03 (the reciprocal of $R_m$=−630),
$C_{s0}$=−1.77430E−02 (the reciprocal of $R_s$=−56.36),
$a_0$=−31.4046, $a_4$=−2.059E−09, $a_6$=1.839E−14, $a_8$=6.366E−18,
$a_{10}$=−8.922E−22, $a_{12}$=6.466E−26, $a_{14}$=−1.339E−30, $a_{16}$=−1.058E−34,
$a_{18}$4.413E−39,
$b_2$=−4.288E−07, $b_4$=1.926E−11, $b_6$=−1.496E−15, $b_8$=1.151E−19,
$b_{10}$=−3.610E−24,
$C_0$=1.554E+01, $C_1$=1.838E−01, $C_2$=−7.853E−03, $C_3$=−3.601E−04,
$C_4$=−2.209E−06, $C_5$=8.826E−08, $C_6$=9.024E−10, $C_7$=−7.718E−12,
$C_8$=−8.927E−14, $C_9$=2.288E−16, $C_{10}$=2.772E−18,
$i_0$=−2.493E−05, $i_1$=−4.327E−08, $i_2$=1.748E−09, $i_3$=−2.625E−10,
$i_4$=−3.835E−12, $i_5$=7.360E−14, $i_6$=1.136E−15, $i_7$=−6.710E−12,
$i_8$=−1.087E−19, $i_9$=2.052E−22, $i_{10}$=3.401E−24
$k_0$=4.310E−06, $k_1$=4.245E−08, $k_2$=−5.695E−10, $k_3$=−1.711E−11,
$k_4$=−1.134E−13, $k_5$=2.449E−15, $k_6$=2.475E−17, $k_7$=−1.648E−19,
$k_8$=−1.501E−21, $k_9$=4.012E−24, $k_{10}$=2.570E−26

The curvature center line plotting a paraxial curvature center in the sub scanning cross section is formed symmetrically relative to the Y coordinate at the fifth surface because the series of the coefficient b are even.

Figure 15A:
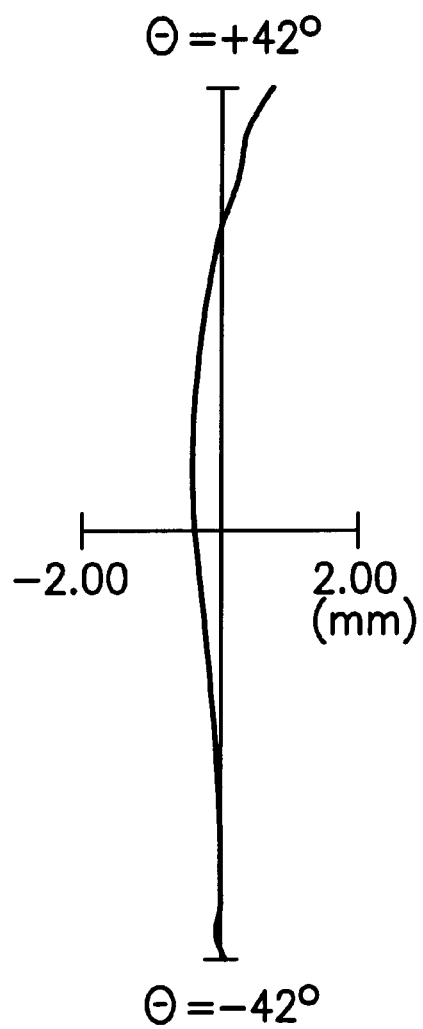
FIGS. 15(a) and 15(b) are diagrams illustrating an example of a paraxial curvature of field in the sub scanning direction and constant velocity characteristics (linearity) relating to a third example of the preferred embodiments of the present invention.
Figure 15B:
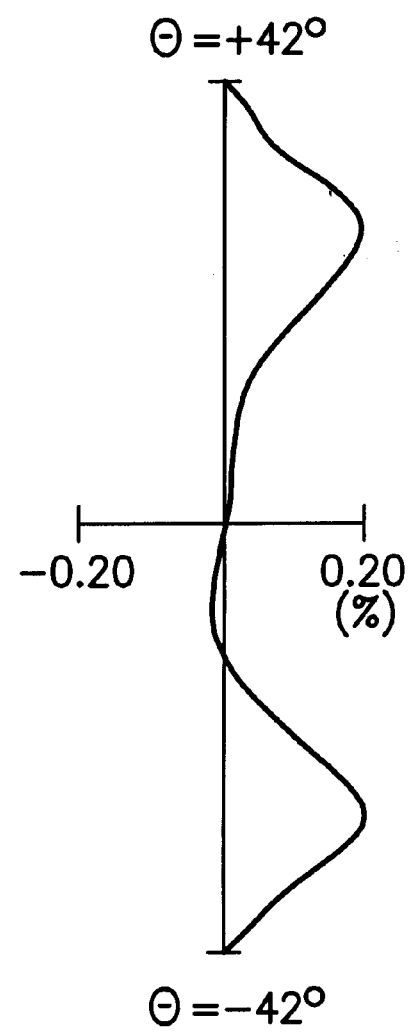

FIGS. 15(a) and 15(b) are diagrams illustrating an example of the paraxial curvature of field in the sub scanning direction and the constant velocity characteristics (linearity) of the Example 3. The maximum width of the paraxial curvature of field is about 1.17 mm. The paraxial curvature of field is corrected more completely than Example 1.

The non-spherical surface correcting amount Δ for the non-arc shape in the sub scanning cross section is symmetrical relative to the optical axis in the main scanning direction, which is indicated in the following Table 3 in substantially the same manner as in Examples 1 and 2:

TABLE 3

| Y | Z = 0 | Z = 0.6 | Z = 1.45 | Z = 2.00 | Z = 2.20 | Z = 2.89 |
|---|---|---|---|---|---|---|
| 117.45 | 0 | −0.002 | −0.045 | −0.056 | −0.013 | 0.814 |
| 111.85 | 0 | −0.001 | −0.022 | −0.005 | 0.041 | 0.713 |
| 97.31 | 0 | 0.000 | 0.013 | 0.081 | 0.139 | 0.682 |
| 82.98 | 0 | 0.001 | 0.033 | 0.127 | 0.190 | 0.631 |
| 68.80 | 0 | 0.002 | 0.068 | 0.218 | 0.301 | 0.670 |
| 54.75 | 0 | 0.003 | 0.099 | 0.282 | 0.363 | 0.458 |
| 40.80 | 0 | 0.004 | 0.114 | 0.291 | 0.349 | 0.067 |
| 26.92 | 0 | 0.005 | 0.118 | 0.285 | 0.325 | −0.177 |
| 13.08 | 0 | 0.005 | 0.120 | 0.292 | 0.335 | −0.154 |
| −0.72 | 0 | 0.004 | 0.118 | 0.299 | 0.353 | 0.012 |
| −13.08 | 0 | 0.004 | 0.109 | 0.284 | 0.344 | 0.125 |
| −26.92 | 0 | 0.003 | 0.093 | 0.245 | 0.299 | 0.158 |
| −40.80 | 0 | 0.003 | 0.076 | 0.206 | 0.255 | 0.191 |
| −54.75 | 0 | 0.002 | 0.065 | 0.187 | 0.242 | 0.321 |
| −68.80 | 0 | 0.002 | 0.056 | 0.176 | 0.239 | 0.480 |
| −82.98 | 0 | 0.001 | 0.046 | 0.152 | 0.213 | 0.525 |
| −97.31 | 0 | 0.001 | 0.043 | 0.143 | 0.203 | 0.509 |
| −111.85 | 0 | 0.001 | 0.047 | 0.159 | 0.225 | 0.571 |
| −117.45 | 0 | 0.001 | 0.036 | 0.130 | 0.190 | 0.555 |

Figure 16:
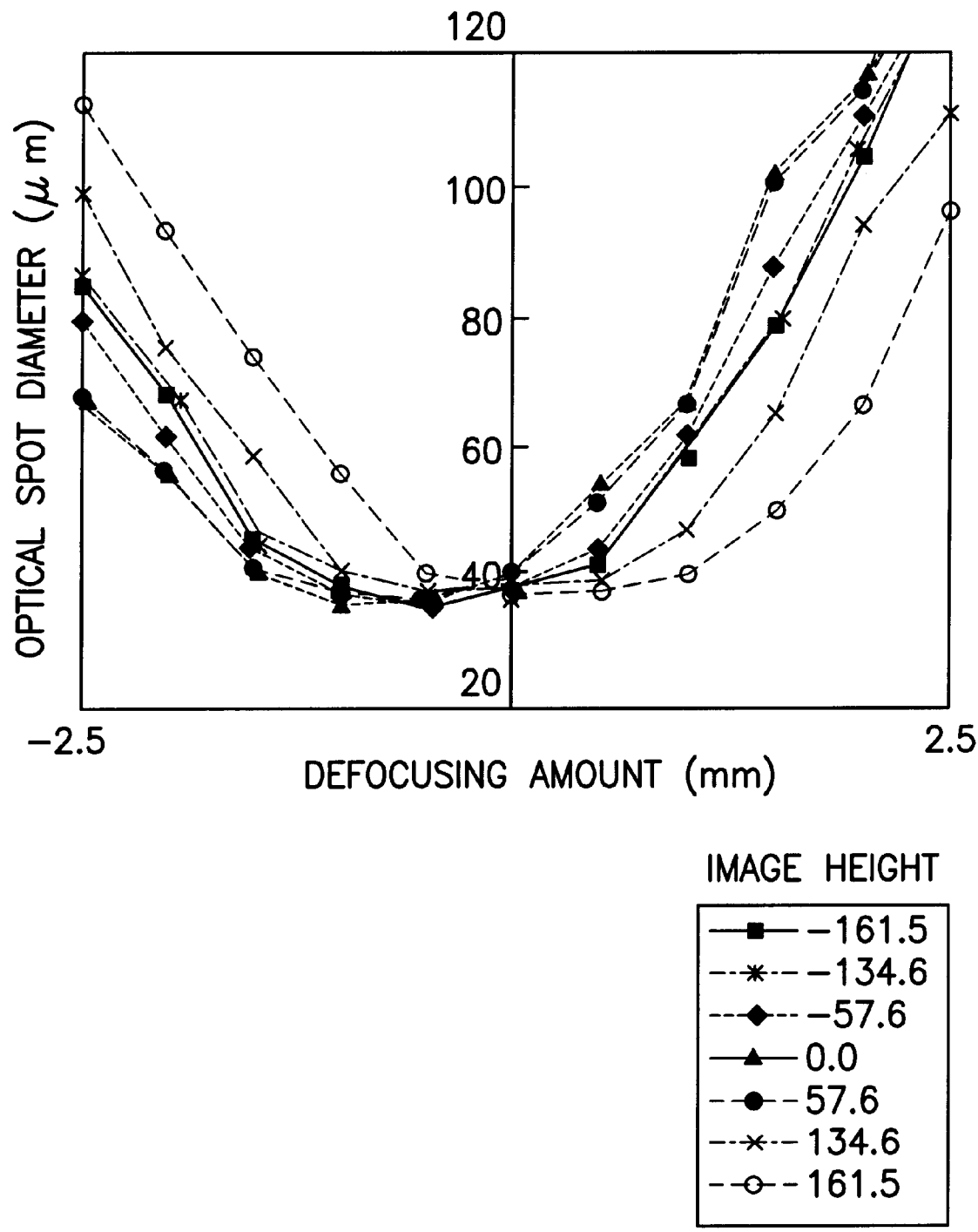
FIG. 16 is a diagram illustrating a change in the optical beam spot diameter in the sub scanning direction according to an image height relative to each of a plurality of defocusing amounts when the beam waist position correcting lens has an arc shape in the sub scanning cross section in the third example of the preferred embodiments, i.e., when a non-spherical surface correction amount (an amount to correct a non-arc shape to an arc shape) is not applied to the beam waist position correcting lens surface in the third example of the preferred embodiments.
Figure 17:
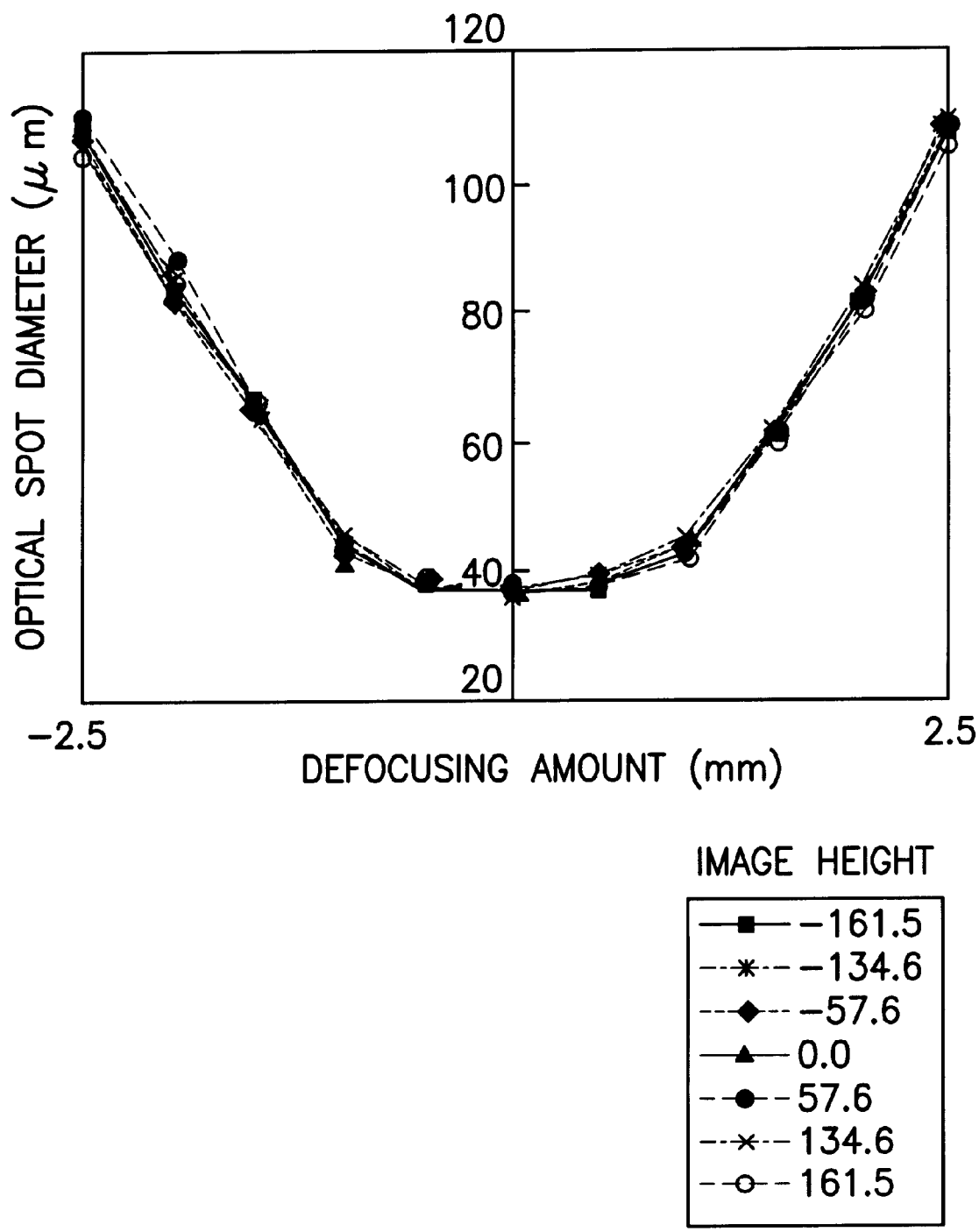
FIG. 17 is a diagram illustrating a change in the optical beam spot diameter in the sub scanning direction according to an image height relative to each defocusing amount when the non-spherical surface correction amount is applied to the beam waist position correcting lens surface in the third example of the preferred embodiments.

FIGS. 16 and 17 are diagrams illustrating, respectively, a change in the optical beam spot diameter in the sub scanning direction relative to each defocusing amount before and after applying the above-described non-spherical surface correction amount Δ to the beam waist position correcting lens surface (the fifth surface).

As illustrated in FIG. 16, in Example 3, even when the fifth surface has an arc shape in the sub scanning cross section, the diameter of an optical beam spot does not significantly change according to the image height in the sub scanning direction at the designed position of the surface to be scanned (the position of the vertical axis in FIG. 16). For example, in FIG. 16, the change in the optical beam spot diameter is within plus and minus 10% of the design value of about 37.3 μm. This is enabled by the paraxial curvature of field being accurately and excellently corrected in the sub scanning direction, as illustrated in FIG. 15.

However, when the position of the surface to be scanned deviates from the designed position due to an assembly error, the diameter of the optical beam spot in the sub scanning direction changes according to the image height except at an area where the defocusing amount is small. For example, when the assembling tolerance of the surface to be scanned is plus and minus 0.5 mm, the optical beam spot diameter changes about 45% relative to the design value of about 37.3 μm.

In contrast, when the non-spherical surface correcting amount is applied to the beam waist position correcting lens surface (the fifth surface), the wave-front aberration of the surface to be scanned is minimized in the sub scanning direction regardless of the position in the main scanning direction by adjusting the non-spherical surface correcting amount Δ, and thereby, the beam waist position of an entire luminous flux can be positioned at the surface to be scanned over the entire surface of the surface to be scanned.

That is, as illustrated in FIG. 17, the diameter of an optical beam spot in the sub scanning direction does not change according to the image height at the position of the vertical axis of the diagram, which corresponds to the designed position of the surface to be scanned. Further, the diameter of the optical beam spot does not change even at a defocused position (i.e., a position deviated from the designed position of the surface to be scanned), and thereby, the diameter of the optical beam spot is maintained substantially constant in the sub scanning direction within a range of the assembling tolerance of the surface to be scanned.

As illustrated in FIG. 12, when the deviation of an optical beam spot from the surface to be scanned due to placement error of the surface to be scanned is assumed to be plus and minus 0.5 mm from the surface to be scanned, the change in the diameter of the optical beam spot is kept within about 7% of a design value of about 37.3 $\mu$m.

Figures 18A, 18B:
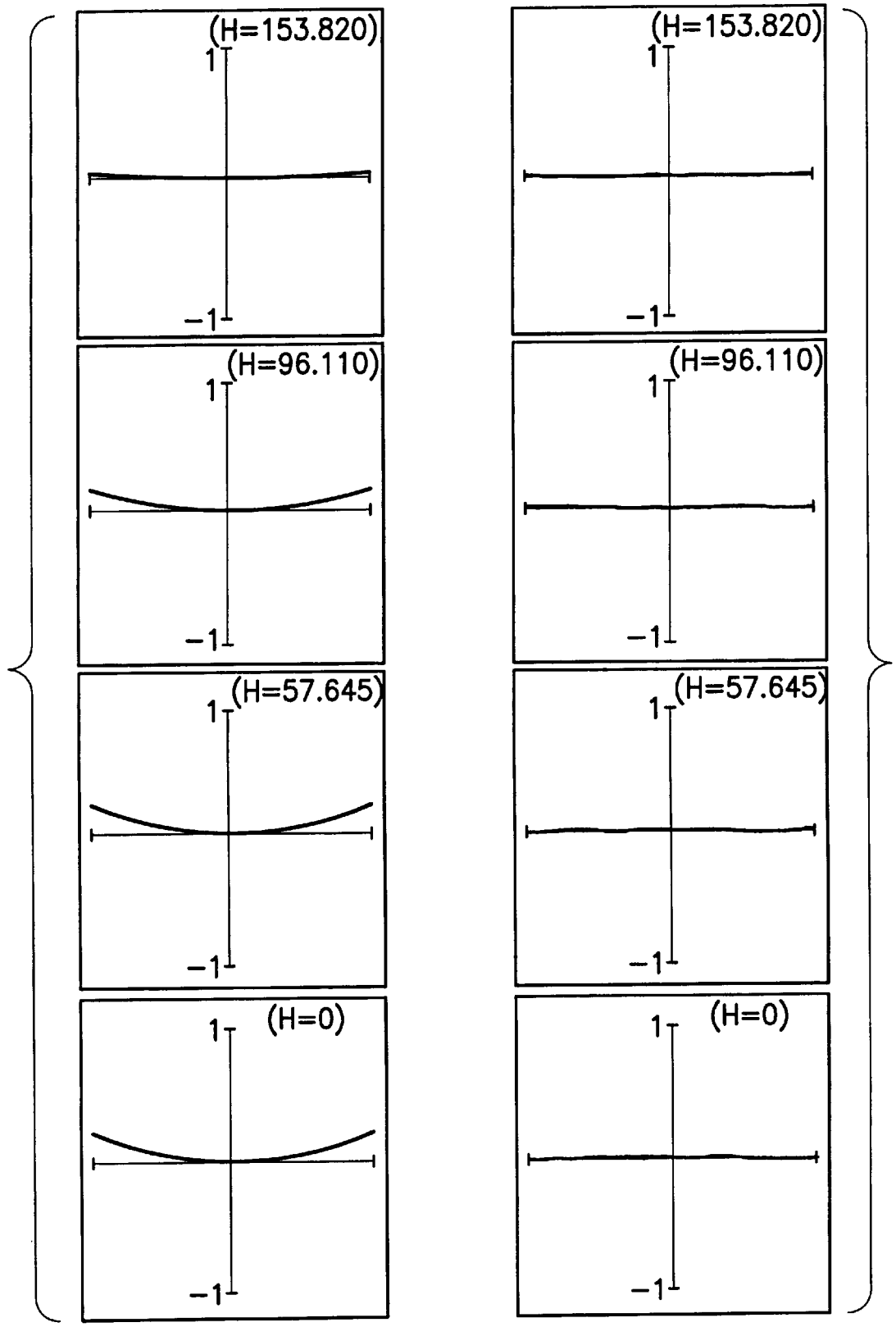
FIG. 18 is a diagram illustrating a wave-front aberration of the scanning image forming lens in the third example of the preferred embodiments, at various image heights on the positive side, before and after applying the non-spherical surface correction amount to the beam waist position correcting surface.
Figures 19A, 19B:
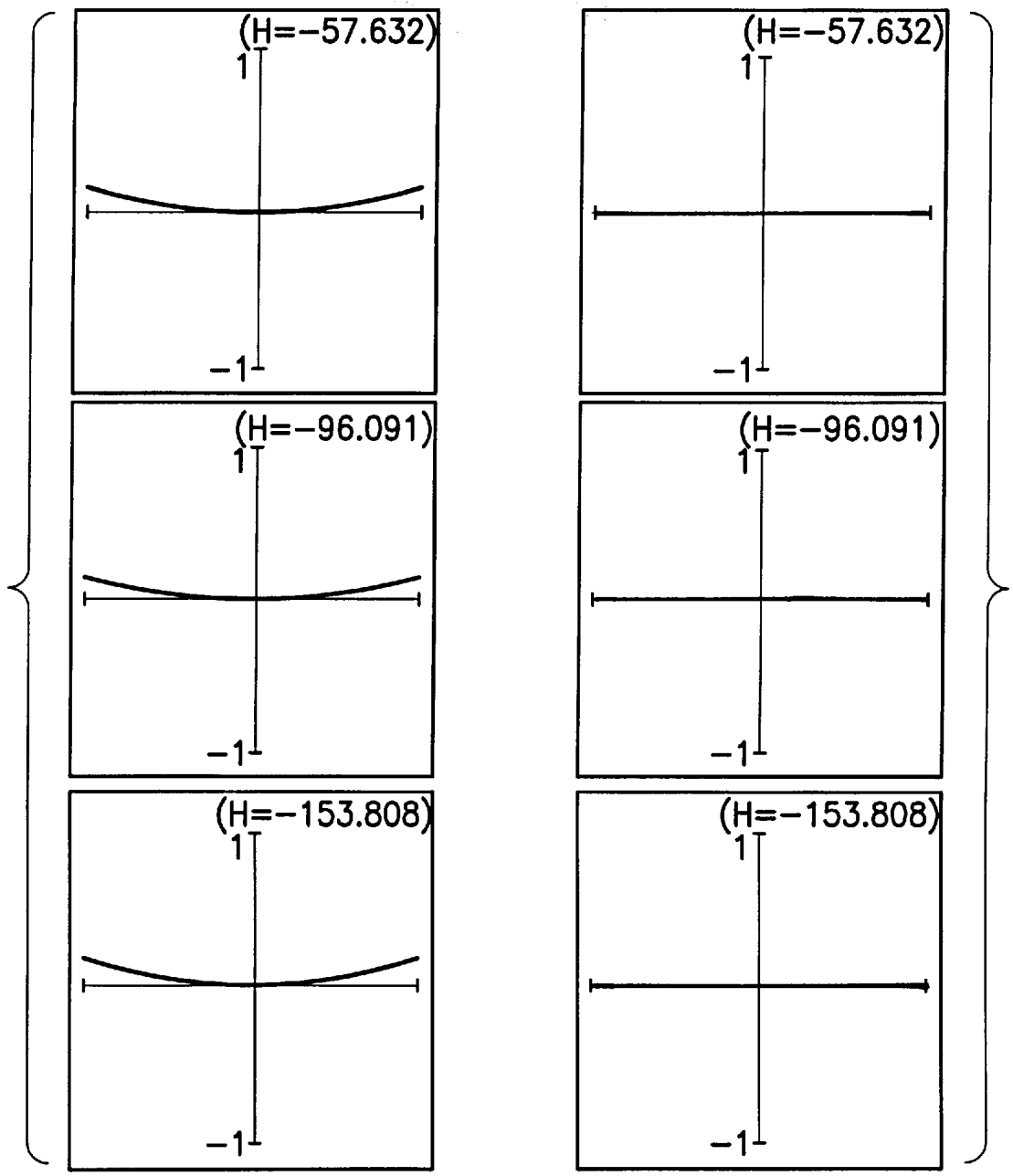
FIG. 19 is a diagram illustrating a wave-front aberration of the scanning image forming lens in the third example of the preferred embodiments, at various image heights on the negative side, before and after applying the non-spherical surface correction amount to the beam waist position correcting surface.

FIGS. 18(a) and 18(b) are diagrams illustrating, respectively, a change in the wave-front aberration on the surface to be scanned in the sub scanning direction in the area where Y≧0 before and after applying the above-described non-spherical surface correction amount $\Delta$ to the beam waist position correcting lens surface. FIGS. 19(a) and 19(b) are diagrams illustrating a change in the wave-front aberration on the surface to be scanned in the sub scanning direction in the area where Y<0. As illustrated in the drawings, the wave-front aberration is accurately and excellently corrected when the non-spherical surface correction amount $\Delta$ is applied to the beam waist position correcting lens surface.

As described above with reference to Examples 1–3, the scanning image forming lens according to preferred embodiments of the present invention produce an optical beam spot having a small diameter, such as for example, 40 $\mu$m, in a stable, reliable and accurate manner.

In the above description, the data has been presented only for the direction corresponding to the sub scanning direction. The performance for the main scanning direction can be optimized while maintaining the performance in the sub scanning direction at a desired level, because the non-arc shape of the beam waist position correcting lens surface in the sub scanning cross section and the change of the non-arc shape according to the position in the Y coordinate can be set independent of the performance in the main scanning direction.

Additional modifications and variations are possible in light of the above teachings. Therefore, it is to be understood that within the scope of the appended claims, the present invention may be practiced otherwise than as specifically described herein.

This document claims priority and contains subject matter related to Japanese patent application No. 10-011844 filed in the Japanese Patent Office on Jan. 23, 1998, the entire contents of which are hereby incorporated by reference.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus comprising:
   a light source for outputting light;
   a first lens system arranged to receive the light output from the light source and to transmit a light flux therefrom;
   an optical deflector arranged to receive the light flux from the first lens system and to deflect the light flux from a surface therefrom;
   a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface including a plurality of portions each having a non-arc shape in a sub-scanning direction such that at least two of the non-arc shapes are different from each other, and
   a first image forming lens and a second image forming lens; wherein
      the second image forming lens includes a first surface and a second surface, the at least one surface of the scanning and image forming element is located at the second surface of the second image forming lens located farther from the optical deflector than the first surface of the second image forming lens.

2. An apparatus according to claim 1, wherein each of the non-arc shapes is different from the other non-arc shapes of the portions of the at least one surface of the scanning and image forming element.

3. An apparatus according to claim 1, wherein the non-arc shapes of the plurality of portions of the at least one surface are arranged such that a wavefront aberration is corrected for all of the image heights.

4. An apparatus according to claim 1, wherein the non-arc shapes are different along lines which are substantially parallel to each other and are substantially perpendicular to the surface to be scanned.

5. An apparatus according to claim 1, wherein an imaging point of a paraxial luminous flux and a field of curvature in the subscanning direction are not changed by the non-arc shapes of the plurality of portions of the at least one surface.

6. An apparatus according to claim 1, wherein the scanning and image forming element is a scanning and image forming lens of the lens system.

7. An apparatus according to claim 1, wherein the scanning and image forming element includes two surfaces.

8. An apparatus according to claim 1, wherein a plurality of the non-arc shapes are different from each other and the different non-arc shapes are asymmetrically disposed relative to an axis extending through the at least one surface at a point along the at least one surface and are arranged substantially perpendicular to the surface to be scanned.

9. An apparatus according to claim 1, wherein the scanning and image forming element is formed of plastic.

10. An apparatus according to claim 1, wherein the scanning and image forming element is formed of plastic and glass.

11. An apparatus according to claim 1, wherein a cross-section in the sub-scanning direction of the scanning and image forming element is formed of plastic.

12. An apparatus according to claim 1, further comprising a first image forming lens and a mirror, wherein the scanning and image forming element defines said first image forming lens.

13. A apparatus according to claim 1, wherein the scanning and image forming element includes said second image forming lens.

14. An apparatus according to claim 1, further comprising a third image forming lens, wherein the scanning and image forming element includes said first, second and third image forming lenses.

15. An apparatus according to claim 1, wherein a paraxial curvature center line plotting a paraxial curvature center of the non-arc shape of the at least one surface of the scanning and image forming element is a curved line in a main scanning cross section.

16. An apparatus according to claim 1, wherein defocusing lines for all of the image heights are substantially coincident with each other.

17. An apparatus according to claim 1, wherein all of the beam spot diameters are within a range for all of the image heights.

18. An apparatus according to claim 1, wherein the scanning and image forming element includes said first and second image forming lenses.

19. An apparatus according to claim 1, wherein the scanning and image forming element includes said first image forming lens and a mirror.

20. An apparatus comprising:
a light source for outputting light;
a first lens system arranged to receive the light output from the light source and to transmit a light flux therefrom;
an optical deflector arranged to receive the light flux from the first lens system and to deflect the light flux from a surface therefrom;
a second lens system arranged to receive the light flux deflected from the optical deflector and to condense the deflected luminous flux into an optical beam spot on a surface to be scanned so as to form images having image heights, the luminous flux condensed by the second lens system into the optical beam spot including an optical beam waist, the second lens system including a scanning and image forming element including at least one surface having a plurality of portions each of which contains a non-arc shape in a sub-scanning direction such that all beam spot diameters are within a range for all image heights, and
a first image forming lens and a second image forming lens; wherein
the second image forming lens includes a first surface and a second surface, the at least one surface of the scanning and image forming element is located at the second surface of the second image forming lens located farther from the optical deflector than the first surface of the second image forming lens.

21. An apparatus according to claim 20, wherein a paraxial curvature center line plotting a paraxial curvature center of the non-arc shape of the at least one surface of the scanning and image forming element is a curved line in a main scanning cross section.

22. An apparatus according to claim 20, wherein the scanning and image forming element includes said second image forming lens.

23. An apparatus according to claim 20, further comprising a third image forming lens, wherein the scanning and image forming element includes said first, second and third image forming lenses.

24. An apparatus according to claim 20, wherein the scanning and image forming element includes said first and second image forming lenses.

25. An apparatus according to claim 20, wherein the scanning and image forming element includes said first image forming lens and a mirror.

26. An apparatus comprising:
means for outputting light;
a first lens means for receiving the light output from the means for outputting light and for transmitting a light flux therefrom;
an optical deflecting means for receiving the light flux from the first lens means and for deflecting the light flux from a surface therefrom;
a second lens means for receiving the light flux deflected from the optical deflecting means and for condensing the deflected luminous flux into an optical beam spot on a surface to be scanned so as to form images having image heights, the luminous flux condensed by the second lens means into the optical beam spot including an optical beam waist, the second lens means including a scanning and image forming means including at least one surface including a plurality of portions each having a non-arc shape in a sub-scanning direction such that at least two of the non-arc shapes are different from each other, and
a first image forming lens and a second image forming lens; wherein
the second image forming lens includes a first surface and a second surface, the at least one surface of the scanning and image forming element is located at the second surface of the second image forming means located farther from the optical deflecting means than the first surface of the second image forming lens.

27. An apparatus according to claim 26, wherein the scanning and image forming means includes said second image forming lens.

28. An apparatus according to claim 26, further comprising a third image forming lens, wherein the scanning and image forming means includes said first, second and third image forming lenses.

29. An apparatus according to claim 26, wherein the scanning and image forming means includes said first and second image forming lenses.

30. An apparatus according to claim 26, wherein the scanning and image forming means includes said first image forming lens and a mirror.

31. An apparatus comprising:
means for outputting light;
a first lens means for receiving the light output from the means for outputting light and for transmitting a light flux therefrom;
an optical deflecting means for receiving the light flux from the first lens means and for deflecting the light flux from a surface therefrom;
a second lens means arranged to receive the light flux deflected from the optical deflecting means and to condense the deflected luminous flux into an optical beam spot on a surface to be scanned so as to form images having image heights, the luminous flux condensed by the second lens means into the optical beam spot including an optical beam waist, the second lens means including a scanning and image forming means including at least one surface having a plurality of portions each of which contains a non-arc shape in a sub-scanning direction such that all beam spot diameters are within a range for all image heights, and
a first image forming lens and a second image forming lens; wherein
the second image forming lens includes a first surface and a second surface, the at least one surface of the scanning and image forming means is located at the second surface of the second image forming lens located farther from the optical deflecting means than the first surface of the second image forming lens.

32. An apparatus according to claim 31, wherein the scanning and image forming means includes said second image forming lens.

33. An apparatus according to claim 31, further comprising a third image forming lens, wherein the scanning and image forming means includes said first, second and third image forming lenses.

34. An apparatus according to claim 31, wherein the scanning and image forming means includes said first and second image forming lenses.

35. An apparatus according to claim 31, wherein the scanning and image forming means includes said first image forming lens and a mirror.

* * * * *